(12) United States Patent
Lin et al.

(10) Patent No.: US 11,003,024 B2
(45) Date of Patent: May 11, 2021

(54) DISPLAY DEVICE

(71) Applicant: InnoLux Corporation, Miao-Li County (TW)

(72) Inventors: Hsiao-Lang Lin, Miao-Li County (TW); Tsung-Han Tsai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/601,598

(22) Filed: Oct. 15, 2019

(65) Prior Publication Data

US 2020/0041844 A1  Feb. 6, 2020

Related U.S. Application Data

(63) Continuation of application No. 16/423,142, filed on May 27, 2019, now Pat. No. 10,481,431, which is a continuation of application No. 15/796,863, filed on Oct. 30, 2017, now Pat. No. 10,353,243.

(60) Provisional application No. 62/539,579, filed on Aug. 1, 2017.

(51) Int. Cl.
| | |
|---|---|
| *G02F 1/13357* | (2006.01) |
| *H01L 27/32* | (2006.01) |
| *G06F 3/041* | (2006.01) |
| *G06F 3/0481* | (2013.01) |
| *G06F 21/32* | (2013.01) |
| *G02F 1/1335* | (2006.01) |

(52) U.S. Cl.
CPC .. *G02F 1/133609* (2013.01); *G02F 1/133603* (2013.01); *G02F 1/133621* (2013.01); *G06F 3/0412* (2013.01); *G06F 3/0481* (2013.01); *G06F 21/32* (2013.01); *H01L 27/3232* (2013.01); *G02F 1/133614* (2021.01); *G02F 1/133617* (2013.01); *G02F 2202/36* (2013.01); *G06F 2221/2133* (2013.01)

(58) Field of Classification Search
None
See application file for complete search history.

(56) References Cited

U.S. PATENT DOCUMENTS

| | | | |
|---|---|---|---|
| 9,343,691 B2 | 5/2016 | Seo | |
| 10,073,294 B1 * | 9/2018 | Lin | ............... G02F 1/1336 |
| 10,481,431 B2 * | 11/2019 | Lin | ............... G06F 3/0481 |
| 2005/0236604 A1 | 10/2005 | Drachev | |
| 2009/0142862 A1 | 6/2009 | Drachev | |

(Continued)

FOREIGN PATENT DOCUMENTS

| | | |
|---|---|---|
| KR | 10-1146528 B1 | 5/2012 |
| KR | 10-2017-0078553 A | 7/2017 |

*Primary Examiner* — Kenneth B Lee, Jr.
(74) *Attorney, Agent, or Firm* — Winston Hsu

(57) ABSTRACT

The disclosure provides a display device, including a display unit emitting an output light having an output spectrum corresponding to a highest gray level of the display device. A maximum peak of the output spectrum from 543 nm to 780 nm is defined as a first intensity peak corresponding to a first wavelength, an intensity integral of the output spectrum from the first wavelength to 780 nm is defined as a first intensity integral, an intensity integral of the output spectrum from 543 nm to the first wavelength is defined as a second intensity integral, and the first intensity integral is greater than the second intensity integral.

20 Claims, 16 Drawing Sheets

(56) References Cited

U.S. PATENT DOCUMENTS

| | | |
|---|---|---|
| 2015/0349278 A1 | 12/2015 | Inoue |
| 2016/0043338 A1 | 2/2016 | Seo |
| 2017/0186922 A1 | 6/2017 | Kim |
| 2018/0246356 A1* | 8/2018 | Lin .................... G02F 1/133621 |
| 2018/0348574 A1* | 12/2018 | Lin .................... G02F 1/133617 |

* cited by examiner

DISPLAY DEVICE

CROSS REFERENCE TO RELATED APPLICATIONS

This application is a continuation application of, and claims the benefit of U.S. patent application Ser. No. 16/423,142 filed on May 27, 2019, which a continuation application of and claims the benefit of U.S. patent application Ser. No. 15/796,863 filed on Oct. 30, 2017 which claims the benefit of U.S. Provisional Application Ser. No. 62/539,579, filed on Aug. 1, 2017, the contents of which are hereby incorporated by reference in their entirety.

BACKGROUND OF THE DISCLOSURE

1. Field of the Disclosure

The present disclosure relates to a display device, and more particularly, to a display device with a high color gamut.

2. Description of the Prior Art

Display devices have advantages of portability, low power consumption, and low radiation. Therefore, they are widely used in various information products, such as desktop computers, laptops, smart phones, vehicle displays and head up displays. The display device is configured to convert acquired or stored electric information into visual information and display it to a user. In traditional display device, the output spectrum of pure red light is usually designed to have a higher peak and smaller full width at half maximum (FWHM) for meeting the requirement of high color gamut of Rec. 2020. However, since the perception of L-cone cells of human eye to the red light is not limited to single wavelength or a narrow range of wavelength, the perception of human eye to the designed red light is not as expected. Accordingly, it is an objective in this field to develop a display device capable of generating the red light that may meet the Rec. 2020 standard and provide high perception to the L-cone cells.

SUMMARY OF THE DISCLOSURE

According to an embodiment, a display device is provided by the present disclosure. The display device includes a display unit emitting an output light having an output spectrum corresponding to a highest gray level of the display device, wherein a maximum peak of the output spectrum from 543 nm to 780 nm is defined as a first intensity peak corresponding to a first wavelength, an intensity integral of the output spectrum from the first wavelength to 780 nm is defined as a first intensity integral, an intensity integral of the output spectrum from 543 nm to the first wavelength is defined as a second intensity integral, the first intensity integral is greater than the second intensity integral, an intensity integral of the output spectrum from 380 nm to 543 nm is defined as a third intensity integral, a difference of subtracting the second intensity integral from the first intensity integral is defined as a first difference, a ratio of the third intensity integral to the first difference is defined as a first ratio, and the first ratio is greater than or equal to 0.5% and less than or equal to 38.0%.

According to an embodiment, a display device is provided by the present disclosure. The display device includes a display unit emitting an output light having an output spectrum corresponding to a highest gray level of the display device, wherein a maximum peak of the output spectrum between 543 nm to 780 nm is defined as a first intensity peak, a maximum peak of the output spectrum between 380 nm to 543 nm is defined as a second intensity peak, a ratio of the second intensity peak to the first intensity peak is defined as a fifth ratio, and the fifth ratio is greater than or equal to 0.1% and less than or equal to 1.5%.

These and other objectives of the present disclosure will no doubt become obvious to those of ordinary skill in the art after reading the following detailed description of the embodiment that is illustrated in the various figures and drawings.

DETAILED DESCRIPTION

Figure 1:
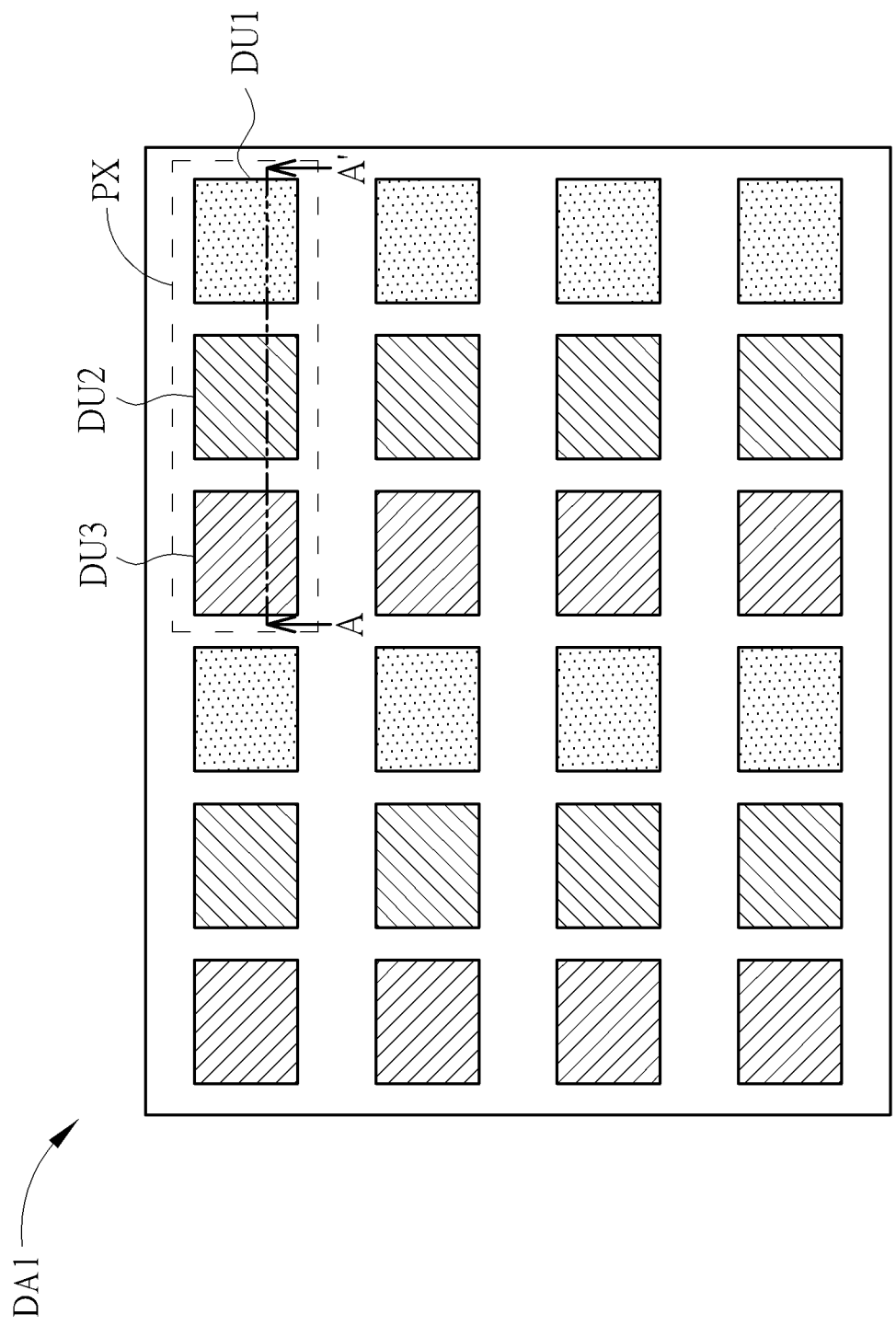
FIG. 1 is a schematic top view of a display device in accordance with a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the display device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ".

It will be understood that when an element or layer is referred to as being "on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented.

It should be noted that the technical features in different embodiments described in the following can be replaced, recombined, or mixed with one another to constitute another embodiment without departing from the spirit of the present disclosure.

In the disclosure, display units of a display device are pixels or sub-pixels for displaying image to the observer in all embodiments. Each display unit is a stacked structure which includes all related layers, elements or parts that are configured to emit light with color and brightness. For self-luminous display device, such as an inorganic light-emitting diode (LED) display device, an organic light-emitting diode (OLED) display device, or a quantum dot light-emitting diode (QLED), the display units are pixels or sub-pixels, and each display unit includes related self-emitting light source, related light converting layer, related part of optical film(s), related substrate(s) and related driving circuit. For non-self-luminous display device, such as a liquid crystal display device, the display units are sub-pixels, and each display unit may include related part of liquid crystal layer, related part of polarizer(s), related part of backlight, related substrate(s), related driving circuit, and related color filter for instance. In addition, several display units may have a common layer, a common element, or a common part.

In the disclosure, the output light is a final optical result from the display unit (or the display units) of the display device to the eyes of the observer (user) in all embodiments, so that the measurement of the output spectrum of the output light should be performed to the light emitted from the display unit out of the display device. Furthermore, the output spectrum of the output light produced by the display unit is measured when the display unit is in an operation of a highest gray level and other display units are switched off. For example, the output spectrum of the output light produced by the display unit is measured when the red display unit (at least one of the red sub-pixels) is in an operation of a highest gray level and the green display unit (all of the green sub-pixels) and blue display unit (all of the blue sub-pixels) are switched off.

Figure 2:
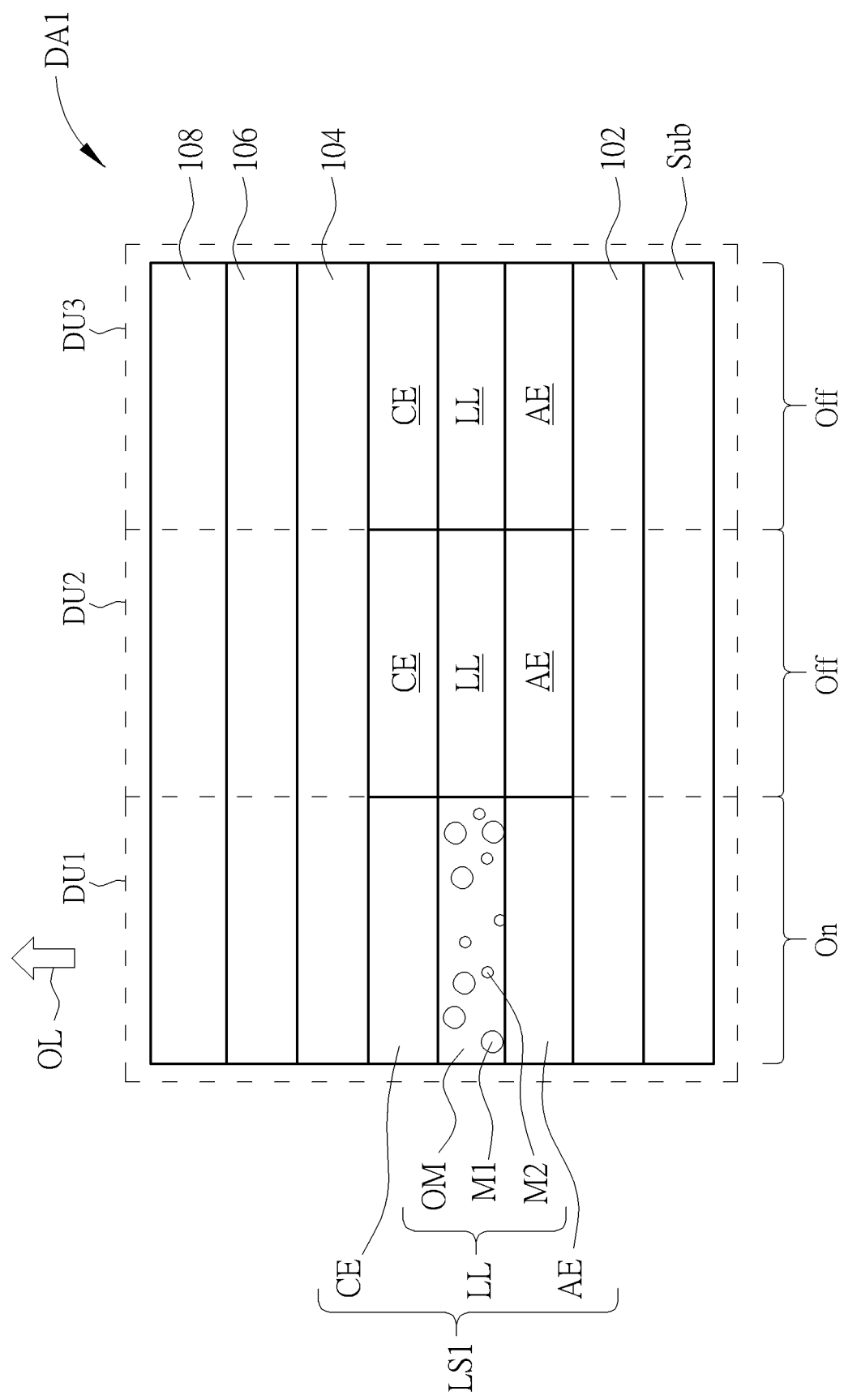
FIG. 2 is a schematic cross-sectional view taken along a cross-sectional line A-A' of FIG. 1.

Referring to FIG. 1 and FIG. 2, FIG. 1 is a schematic top view of a display device in accordance with a first embodiment of the present disclosure, and FIG. 2 is a schematic cross-sectional view taken along a cross-sectional line A-A' of FIG. 1. According to the present disclosure, the display device DA1 includes at least one display unit DU1 for emitting a kind of color light. In this embodiment, the display device DA1 may optionally further include at least one display unit DU2 and display unit DU3 for emitting other kinds of color lights. The light emitted from the display unit DU1, the light emitted from the display unit DU2 and the light emitted from the display unit DU3 have different spectrums respectively. As shown in FIG. 1 and FIG. 2, the display device DA1 of this embodiment may include a plurality of display units DU1, a plurality of display units DU2, and a plurality of display units DU3. For example, the display units DU1, the display units DU2 and the display units DU3 may be arranged in a rectangular form and as an array, but not limited herein. Furthermore, one of the display units DU1, one of the display units DU2 and one of the display units DU3 may form a pixel PX, and the display unit DU2 is disposed between the display unit DU1 and the display unit DU3 in each pixel PX, but the arrangement of the display units is not limited thereto. For example, each display unit DU1 may represent a red sub-pixel, each display unit DU2 may represent a green sub-pixel, and each display unit DU3 may represent a blue sub-pixel. In some embodiments, the number of the sub-pixels with one color may not be the same as the number of the sub-pixels with another color.

Each of the display units DU1, the display units DU2 and the display units DU3 may be constituted by a plurality of elements. In this embodiment, the display device DA1 may be a self-luminous display device. The display device DA1 includes a substrate Sub and a plurality of light sources LS1. The light sources LS1 are disposed on the substrate Sub, and are configured to generate light. The display unit DU1 includes a part of the substrate Sub and one of the light sources LS1, the display unit DU2 includes another part of the substrate Sub and another one of the light sources LS1, and the display unit DU3 includes another part of the substrate Sub and another one of the light sources LS1. The substrate Sub may be a hard substrate, such as a glass substrate, a plastic substrate, a quartz substrate or a sapphire substrate, or may be a flexible substrate, such as a polyimide (PI) substrate or a polyethylene terephthalate (PET) substrate, but not limited herein. Each light source LS1 of this embodiment may be for example an organic light-emitting diode, which includes an anode AE, a cathode CE and a light-emitting layer LL between the anode AE and the cathode CE. Each light-emitting layer LL includes an organic light-emitting material, and accordingly the display device DA1 of this embodiment may be an organic light-emitting diode display device, but not limited thereto. The organic light-emitting material OM of each display unit DU1, the organic light-emitting material of each display unit DU2 and the organic light-emitting material of each display unit DU3 may not be the same. In other words, the light source LS1 of each display unit DU1, the light source LS1 of each display unit DU2 and the light source LS1 of each display unit DU3 may generate lights with different colors or spectrums respectively. For example, the organic light-emitting material OM of each display unit DU1 may generate red light, the organic light-emitting material of each display unit DU2 may generate green light, and the organic light-emitting material of each display unit DU3 may generate blue light.

In this embodiment, the light-emitting layer LL in each display unit DU1 may further include at least one first color adjusting material M1 and at least one second color adjusting material M2. The first color adjusting material M1 and the second color adjusting material M2 may be used to convert or adjust the color of the light generated from the organic light-emitting material OM in each display unit DU1. For instance, the first color adjusting material M1 and the second color adjusting material M2 may include a quantum dot material, a color filter material, a phosphor material or a pigment material. The quantum dot material may be formed in a semiconductor nanocrystal structure, and the quantum dot material may include CdSe, CdS, CdTe, ZnSe, ZnTe, ZnS, HgTe, InAs, $Cd_{1-x}Zn_xSe_{1-y}S_y$, CdSe/ZnS, InP, GaAs or a combination of at least two thereof. In another embodiment, the organic light-emitting material of each light-emitting layer LL may be replaced by an electroluminescent quantum dot material, so each light source LS1 may be a quantum dot light-emitting diode, and the display device DA1 may be a quantum dot light-emitting diode display device, but not limited thereto.

In addition, the display device DA1 of this embodiment may further include a circuit layer 102, a capping layer 104, a barrier film 106, and an optical film 108, so besides the part of the substrate Sub and the light source LS1, each display unit DU1, each display unit DU2 and each display unit DU3 may further include a part of the circuit layer 102, a part of the capping layer 104, a part of the barrier film 106 and a part of the optical film 108 respectively. The circuit layer 102 is disposed between the light sources LS1 and the substrate Sub, and used to drive the light sources LS1 to generate lights and make the display device DA1 display image. The circuit layer 102 may include for example transistors, gate lines, data lines, common lines, electrodes, insulating layers, encapsulation layers, capacitors, wires or other elements or films, but not limited thereto. The capping layer 104, the barrier film 106 and the optical film 108 may be stacked on the light sources LS1 sequentially. The capping layer 104 may be used to protect the organic light-emitting diode, the barrier film 106 may be used to block moisture and oxygen from damaging the light-emitting layers LL, and the optical film 108 may be used to protect the light sources LS1 and the circuit layer 102. The display device DA1 of this embodiment is not limited to the above-mentioned description. The display device DA1 may further include for instance films for enhance brightness of light, such as a hole transport layer and an electron transport layer, and each display unit DU1, each display unit DU2 and each display unit DU3 may further include a part of each film, but not limited thereto.

Figure 3:
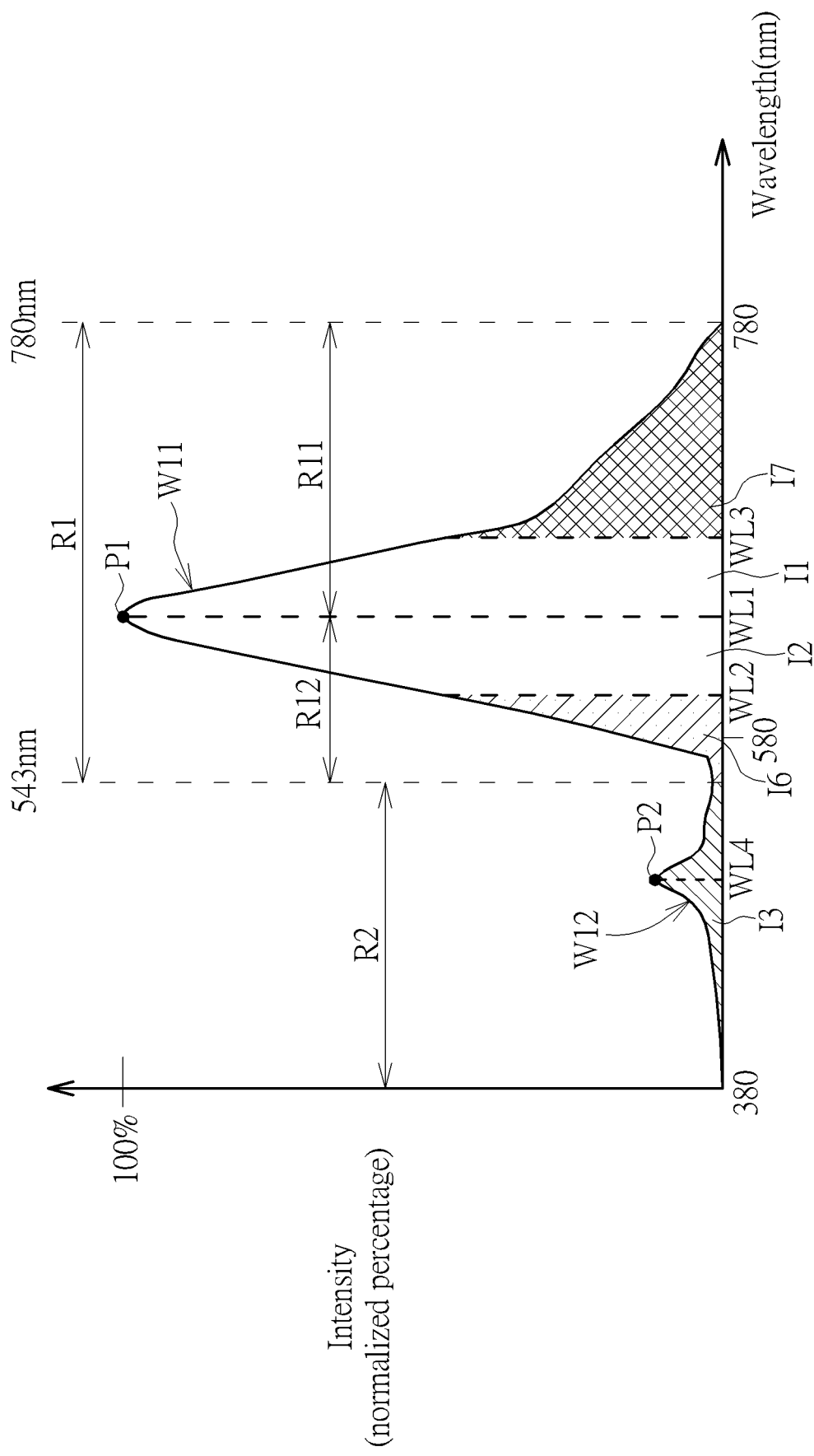
FIG. 3 is a schematic diagram illustrating the output spectrum of the output light emitted from the display unit of the display device corresponding to the highest gray level in accordance with the first embodiment of the present disclosure.

Referring to FIG. 3 together with FIG. 2, FIG. 3 is a schematic diagram illustrating the output spectrum of the output light emitted from the display unit DU1 of the display device corresponding to the highest gray level in accordance with the first embodiment of the present disclosure. The output light OL is for example emitted from one display unit DU1, but not limited thereto. The output light OL may also represent output lights emitted by a plurality of the display units DU1 in the present disclosure. As shown in FIG. 2 and FIG. 3, the output light OL of the display unit DU1 corresponds to the highest gray level of the display device DA1, and the output light has an output spectrum, which means the output spectrum of the output light OL is measured outside the light-emitting surface (that is display surface) of the display device DA1 when the display device DA1 is in the operation of the highest gray level and the display units DU2 and the display units DU3 are turned off (operated in the lowest gray level). Accordingly, the output light OL may be the light of one of the red sub-pixels provided to the observer. For example, for 8-bit deep image, the highest gray level may be 255, but not limited thereto. Or, the operation of the highest gray level may be performed by driving the corresponding circuit of the display device DA1 with a highest driving voltage.

The output spectrum of the output light OL in a first wavelength range R1 from 543 nm to 780 nm has a maximum peak that is defined as a first intensity peak P1 corresponding to a first wavelength. For example, the first wavelength WL1 may be greater than or equal to 604 nm and less than or equal to 644 nm. Or, the first wavelength WL1 may be 624 nm that represents the red primary color in the Rec. 2020 color gamut. Additionally, the first wavelength range R1 may be separated into a first sub-range R11 and a second sub-range R12. The first sub-range R11 is from the first wavelength WL1 to 780 nm, and the second sub-range R12 is from 543 nm to the first wavelength WL1. An intensity integral of the output spectrum in the first sub-range R11 is defined as a first intensity integral I1, an intensity integral of the output spectrum in the second sub-range R12 is defined as a second intensity integral I2, and a sum of the first intensity integral I1 and the second intensity integral I2 is defined as a first sum (I1+I2) that is the intensity integral of the output spectrum in the first wavelength range R1. Each intensity integral may represent energy of the output light OL in the corresponding wavelength range. In this embodiment, the first intensity integral I1 is greater than the second intensity integral I2, and a difference of subtracting the second intensity integral I2 from the first intensity integral I1 is defined as a first difference (I1−I2). Specifically, the output spectrum has a first wave W1 in the first wavelength range R1. Since the first intensity integral I1 is different from the second intensity integral I2, a part of the first wave W1 in the first sub-range R11 is not symmetric to another part of the first wave W1 in the second sub-range R12. For the first wave W1, the organic light-emitting material OM can be used to generate most of the first wave W1, that is to say the organic light-emitting material OM can be used to generate a part of the output light OL corresponding to the second intensity integral and another part of the output light OL corresponding to a part of the first intensity integral that is substantially the same the second intensity integral. Also, the second color adjusting material M2 can be used to generate another part of the output light OL corresponding to the difference between the first intensity integral I1 and the second intensity integral I2 (that is the first difference), and thus, the first intensity integral I1 can be greater than the second intensity integral I2. In other words, an intensity of a part of the first wave W1 corresponding to deep red is greater than the intensity of another part of the first wave W1 corresponding to orange-red. Furthermore, a second wavelength WL2 and a third wavelength WL3 correspond to an intensity of a half of the first intensity peak, and the second wavelength WL2 is less than the third wavelength WL3. An intensity integral of the output spectrum from 543 nm to the second wavelength WL2 is defined as a sixth intensity integral I6, an intensity integral of the output spectrum from the third wavelength W3 to 780 nm is defined as a seventh intensity integral I7, a ratio of the sixth intensity integral I6 to the seventh intensity integral I7 is defined as a fourth ratio (I6/I7), and the fourth ratio is designed to be greater than or equal to 37.0% and less than or equal to 99.0%. For example, when a fifth wavelength and a sixth wavelength correspond to an intensity of a quarter of the first intensity peak P1 and the fifth wavelength is less than the sixth wavelength, a ratio of an intensity integral of the output spectrum from 543 nm to the fifth wavelength to an intensity integral of the output spectrum from the sixth wavelength to 780 nm can be designed to be greater than or equal to 37.0% and less than or equal to 82.0%. When a seventh wavelength and an eighth wavelength correspond to an intensity of an eighth of the first intensity peak P1 and the seventh wavelength is less than the eighth wavelength, a ratio of an intensity integral of the output spectrum from 543 nm to the seventh wavelength to an intensity integral of the output spectrum from the eighth wavelength to 780 nm can be designed to be greater than or equal to 26.0% and less than or equal to 90.0%. In a variant embodiment, the light-emitting layer LL in each display unit DU1 may also include two or more second color adjusting material M2 to make the first intensity integral be greater than the second intensity integral.

In addition, the output spectrum in the second wavelength range R2 from 380 nm to 543 nm has a maximum peak that is defined as a second intensity peak P2, and an intensity integral of the output spectrum in the second wavelength range R2 is defined as a third intensity integral I3. A ratio of the third intensity integral I3 to the first difference is defined as a first ratio (I3/(I1−I2)), and the first ratio is greater than or equal to 0.5% and less than or equal to 38.0%. In this embodiment, the first sum of the first intensity integral I1 and the second intensity integral I2 is greater than the third intensity integral I3, so that the output light OL emitted by the display unit DU1 can be regarded as a red light of the red sub-pixel. The output spectrum of this embodiment may has a second wave W2 with the second intensity peak P2 in the second wavelength range R2, and the second intensity peak P2 corresponding to a fourth wavelength WL4, but the output spectrum is not limited to have one second wave W2, or the second wave W2 is not limited to have one intensity peak. A ratio of the third intensity integral I3 to the first sum is defined as a second ratio (I3/(I1+I2)), and the second ratio may be greater than or equal to 0.05% and less than or equal to 0.50%. The first color adjusting material M1 of this embodiment may make the output spectrum of the output light OL have the third intensity integral I3 in the second wavelength range R2, which means the first color adjusting material M1 makes the output spectrum of the output light OL have the second wave W2. It should be noted that L-cone cells are sensitive cone cells in human eye to the red light, and the wavelength range sensed by the L-cone cells is substantially from 400 nm to 700 nm, so through designing the output spectrum of the output light OL to have a certain intensity in the second wavelength range R2, the perception of L-cone cells in human eye to the output light OL can be effectively improved in the condition without largely affecting the color of the output light OL, thereby raising the perception of the human eye to the light intensity of the red sub-pixel and increasing recognition rate of the human eye to the output light OL. In a variant embodiment, the light-emitting layer LL in each display unit DU1 may further include two or more first color adjusting material M1 to make the output spectrum of the output light OL have the third intensity integral I3 in the second wavelength range R1.

Since the output light OL has a certain intensity in the second wavelength range R2, in order to avoid the intensity in the second wavelength range R2 affecting the color of the output light OL, the first intensity integral I1 is designed to be greater than the second intensity integral I2. For doing this, the first ratio is designed to be greater than or equal to 0.5% and less than or equal to 38.0%. Because the red represented by the first sub-range R11 is deeper than the red represented by the second sub-range R12, the color of the output light OL can be deeper than the color of the first wavelength WL1 through designing the first ratio to be greater than or equal to 0.5% and less or equal to 38.0%. Accordingly, the color of the output light OL can be close to the edge of the Rec. 2020 color gamut, and the Rec. 2020 color gamut coverage can also be increased.

In the disclosure, the method to make the color of the output light OL be close to the edge of the Rec. 2020 color gamut may also be achieved through designing the first intensity peak P1 to be greater than the second intensity peak P2 without meeting the above-mentioned first ratio. Specifically, a ratio of the second intensity peak P2 to the first intensity peak P1 is defined as a fifth ratio (P2/P1), and the fifth ratio may be greater than or equal to 0.1% and less than or equal to 1.5%. The output light OL of the display unit DU1 of this embodiment is designed to have the first ratio that is greater than or equal to 0.5% and less than or equal to 38.0% and the fifth ratio that is greater than or equal to 0.1% and less than or equal to 1.5%, but the present disclosure is not limited to meet both.

Figure 4:
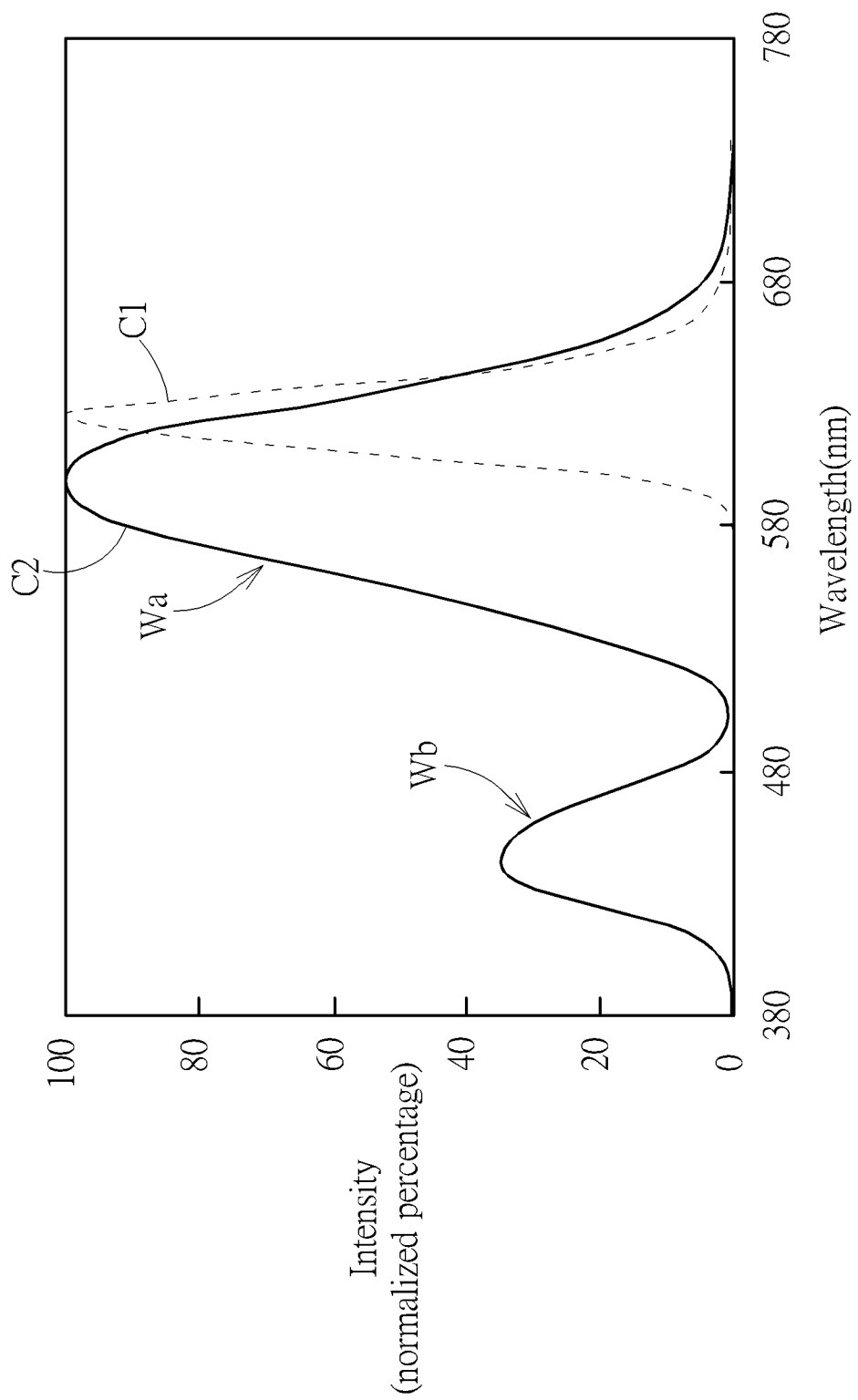
FIG. 4 is a schematic diagram illustrating spectrums according to the first comparative embodiment and the second comparative embodiment.
Figure 5:
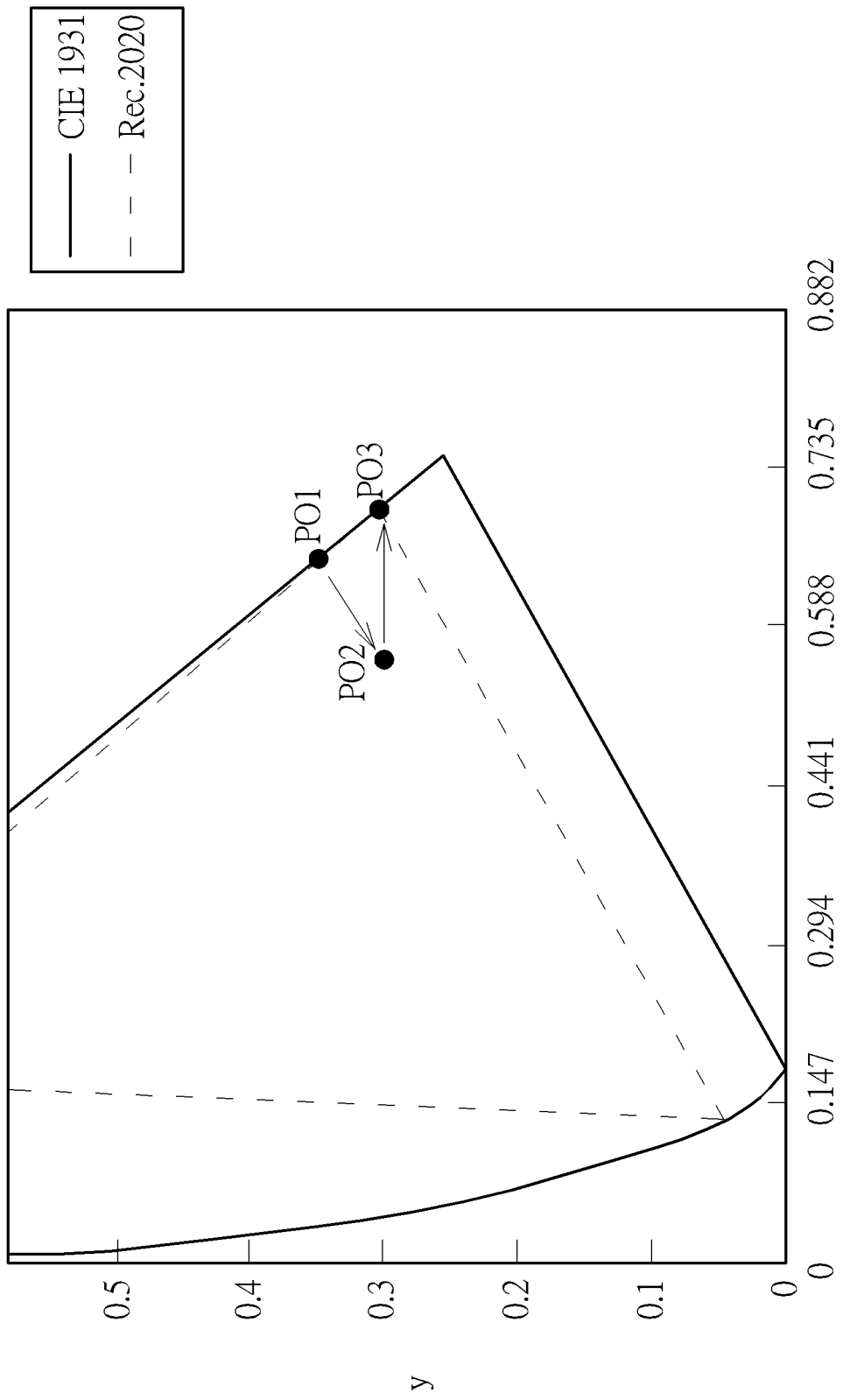
FIG. 5 is a CIE 1931 xy chromaticity diagram showing positions of the output lights according to the first embodiment, the first comparative embodiment and the second comparative embodiment.

The output light OL of this embodiment is further compared with the output light of the first comparative embodiment and the output light of the second comparative embodiment in the following description, so as to show the function of the output light OL of this embodiment. Referring to FIG. 4 and FIG. 5 as well as FIG. 3, FIG. 4 is a schematic diagram illustrating spectrums according to the first comparative embodiment and the second comparative embodiment, and FIG. 5 is a CIE 1931 xy chromaticity diagram showing positions of the output lights according to the first embodiment, the first comparative embodiment and the second comparative embodiment. As shown in FIG. 4, a curve C1 represents a spectrum of an output light of the first comparative embodiment, and an intensity integral of the spectrum of the output light from a peak wavelength of the spectrum to 780 nm is substantially the same as an intensity integral of the spectrum of the output light from 543 nm to the peak wavelength in the first comparative embodiment, so that the spectrum has a symmetric waveform. For example, the output light of the first comparative embodiment may be generated by one quantum dot material. A curve C2 represents a spectrum of an output light of the second comparative embodiment, which has two waves Wa, Wb, and there is a bottom between the waves Wa, Wb. A peak of the wave Wa is greater than a peak of the wave Wb. In the second comparative embodiment, an intensity integral of the wave Wa from the bottom to a peak wavelength of the wave Wa is substantially the same as an intensity integral of the wave Wa from the peak wavelength to 780 nm, so that the wave Wa also has a symmetric waveform. As shown in FIG. 5, when the spectrum of the output light has the symmetric waveform, the color of the output light is located at a point PO1 that is close to the edge of CIE 1931 color gamut space and the edge of the Rec. 2020 color gamut, which means the color of the output light of the first comparative embodiment is at the point PO1. Although the color of the output light of the first comparative embodiment can almost meet the requirement of the Rec. 2020 color gamut, the perception of the human eye to the output light of the first comparative embodiment is not as expected. Compared to the first comparative embodiment, the output light of the second comparative embodiment further has the wave Wb. Since the wavelength of the wave Wb is less than the wavelength of the symmetric wave Wa, the perception of the human eye to the output light of the second comparative embodiment can be increased. However, the color of the output light of the second comparative embodiment is moved to a point PO2 that is in the Rec. 2020 color gamut, and a distance from the point PO2 to the edge of the Rec. 2020 color gamut is greater than that from the point PO1 to the edge of the Rec. 2020 color gamut, which means the second comparative embodiment increases the recognition rate of the human eye but reduces the Rec. 2020 color gamut coverage. Compared to second comparative embodiment, the output spectrum of the output light OL in the first embodiment has the asymmetric first wave W11 as shown in FIG. 3, that is to say the first ratio is greater than or equal to 0.5% and less than or equal to 38.0%, or the fifth ratio is greater than or equal to 0.1% and less than or equal to 1.5% in the first embodiment, so that the color of the output light OL of the first embodiment can be moved to a point PO3 that is located close to or on the corner of the Rec. 2020 color gamut. Hence, the color of the output light OL of the first embodiment not only can increase the perception of L-cone cells in the human eye to the output light OL, but also may meet the requirement of the high Rec. 2020 color gamut.

With reference to Table 1, Table 1 shows an intensity integral ratio of the output light of the first comparative embodiment to the output light of the second comparative embodiment, an intensity integral ratio of the output light of the first embodiment to the output light of the second comparative embodiment, and the Rec. 2020 color gamut coverage ratios of the output light of the first comparative embodiment, the output light of the second comparative embodiment and the output light of the first embodiment. As shown in Table 1 and FIG. 5, the output light OL of the first embodiment may increases the Rec. 2020 color gamut coverage ratio, such as 99%, as compared with the first comparative embodiment and the second comparative embodiment. Furthermore, the intensity integral ratio of the output light OL of the first embodiment may be raised to be greater than the intensity integral ratios of the output light of the first comparative embodiment and the output light of the second comparative embodiment.

TABLE 1

|  | the first comparative embodiment | the second comparative embodiment | the first embodiment |
| --- | --- | --- | --- |
| intensity integral ratio | 98% | 100% | 121% |
| Rec. 2020 color gamut coverage ratio | 96% | 93% | 99% |

The display device is not limited by the aforementioned embodiment, and may have other different variant embodiments or embodiments. To simplify the description, the identical components in each of the following variant embodiments or embodiments are marked with identical symbols. For making it easier to compare the difference between the first embodiment and the variant embodiment and the difference between the first embodiment and other embodiments, the following description will detail the dissimilarities among different variant embodiments or embodiments and the identical features will not be redundantly described.

Figure 6:
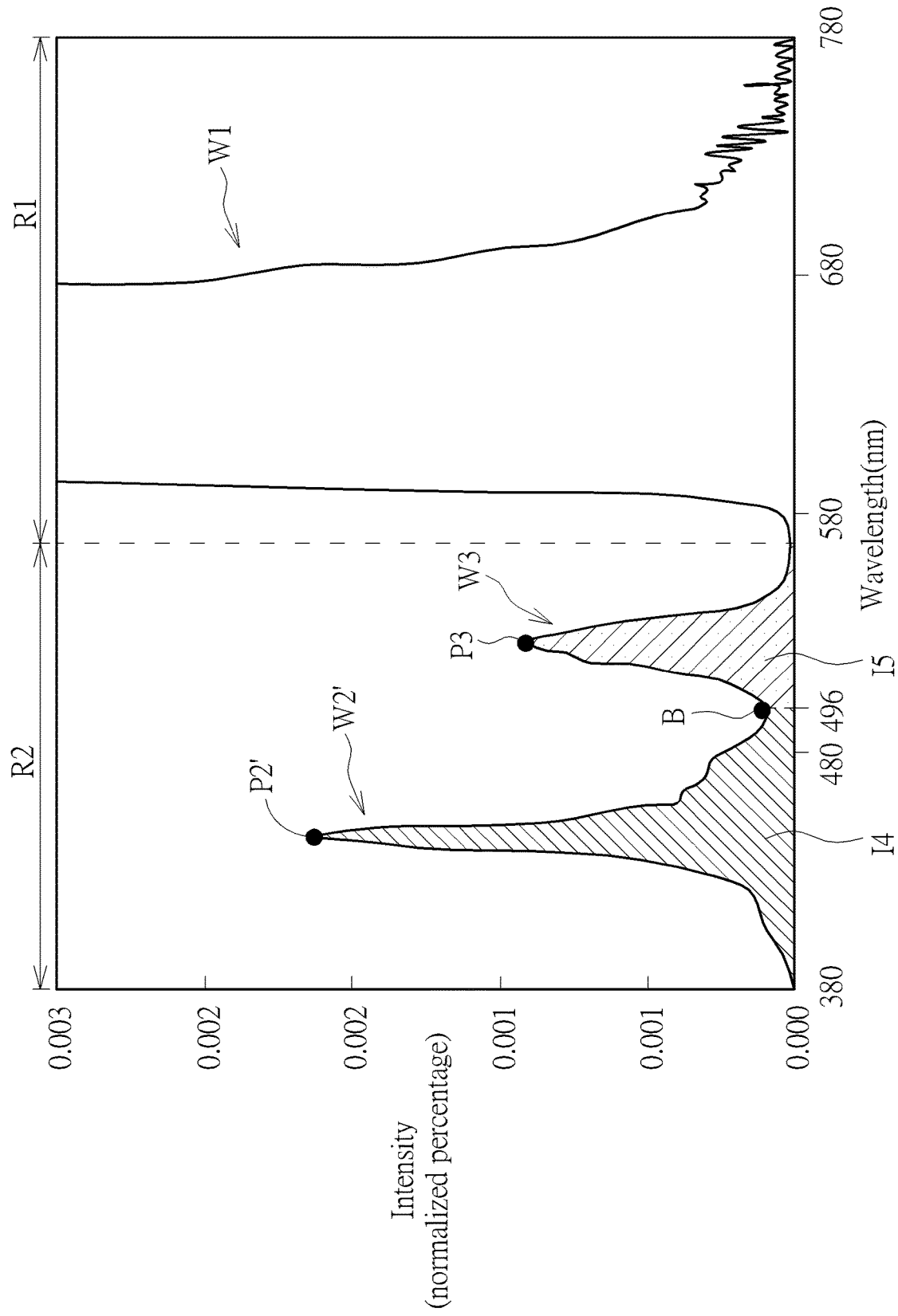
FIG. 6 is a schematic diagram illustrating the output spectrum of the output light in accordance with a first variant embodiment of the first embodiment of the present disclosure.

Refer to FIG. 6, which is a schematic diagram illustrating the output spectrum of the output light in accordance with a first variant embodiment of the first embodiment of the present disclosure. As shown in FIG. 6, compared to the output spectrum of the first embodiment, the output spectrum of the output light of this variant embodiment from 380 nm to 543 nm (that is in the second wavelength range R2) includes two or more waves. Specifically, the output spectrum from 380 nm to 543 nm may include a second wave W2' and a third wave W3. The second wave W2' is from 380 nm to 496 nm, and the third wave W3 is from 496 nm to 543 nm. In this variant embodiment, a bottom B exists between the second wave W2' and the third wave W3, and the bottom B corresponds to a wavelength, such as 496 nm. In other words, the second wave W2' and the third wave W3 are not continuous wave, but the present disclosure is not limited thereto. In this variant embodiment, an intensity integral of the output spectrum from 380 nm to 496 nm (that is the intensity integral of the second wave W2') is defined as a fourth intensity integral I4, an intensity integral of the output spectrum from 496 nm to 543 nm (that is the intensity integral of the third wave W3) is defined as a fifth intensity integral I5, and a ratio of the fifth intensity integral I5 to the fourth intensity integral I4 is defined as a third ratio (I5/I4). The third ratio is greater than or equal to 1.0% and less than or equal to 77.0%. Moreover, the second intensity peak P2' corresponding to the second wave W2' may be greater than the third intensity peak P3 corresponding to the third wave W3, but not limited thereto.

Figure 7:
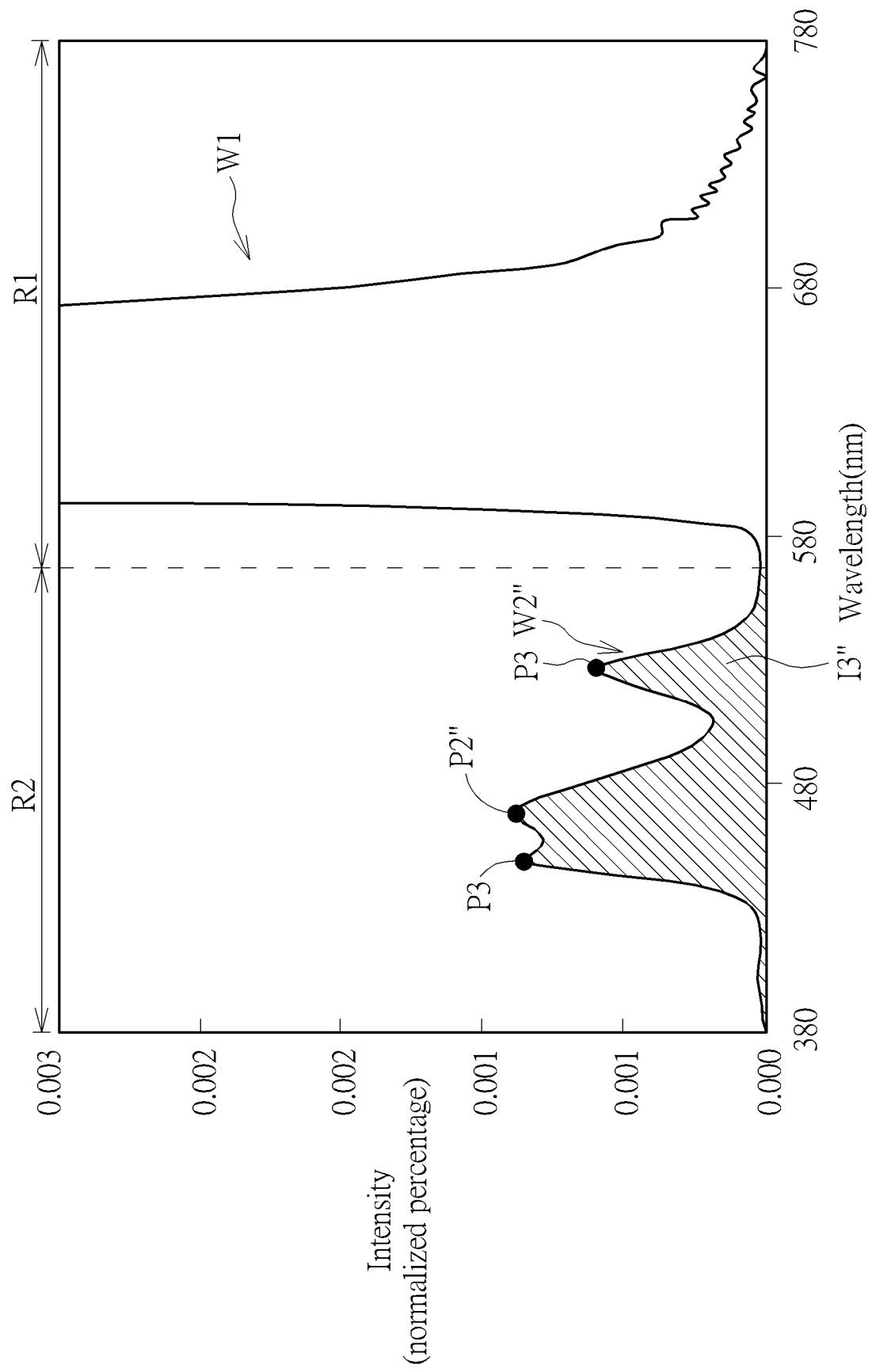
FIG. 7 is a schematic diagram illustrating the output spectrum of the output light in accordance with a second variant embodiment of the first embodiment of the present disclosure.

Refer to FIG. 7, which is a schematic diagram illustrating the output spectrum of the output light in accordance with a second variant embodiment of the first embodiment of the present disclosure. As shown in FIG. 7, compared to the output spectrum of the first embodiment, the output spectrum of the output light of this variant embodiment from 380 nm to 543 nm (that is in the second wavelength range R2) includes two or more intensity peaks. Specifically, the output spectrum from 380 nm to 543 nm may further include at least one third intensity peak P3 besides the second intensity peak P2". In this variant embodiment, the output spectrum from 380 nm to 543 nm may include two third intensity peaks P3, and any two of the second intensity peak P2" and the third intensity peaks P3 may be the same or different. In other words, the second wave W2" may be a continuous wave with three intensity peaks and from 380 nm to 543 nm. In this variant embodiment, the second ratio of the third intensity integral I3" to the first sum may be greater than or equal to 0.05% and less than or equal to 4.00%.

Figure 8:
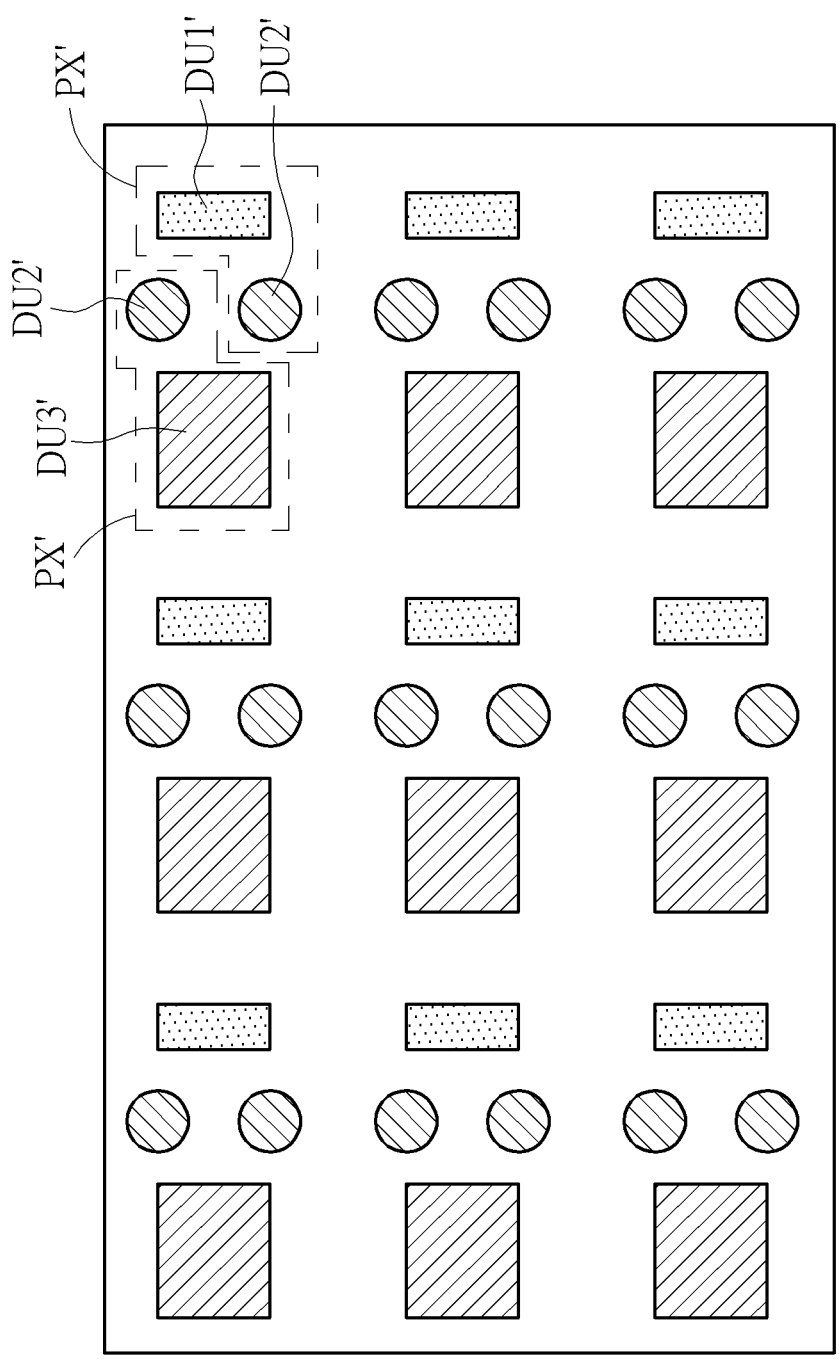
FIG. 8 is a schematic diagram illustrating an arrangement of the display units in accordance with a variant embodiment of the first embodiment of the present disclosure.
Figure 9:
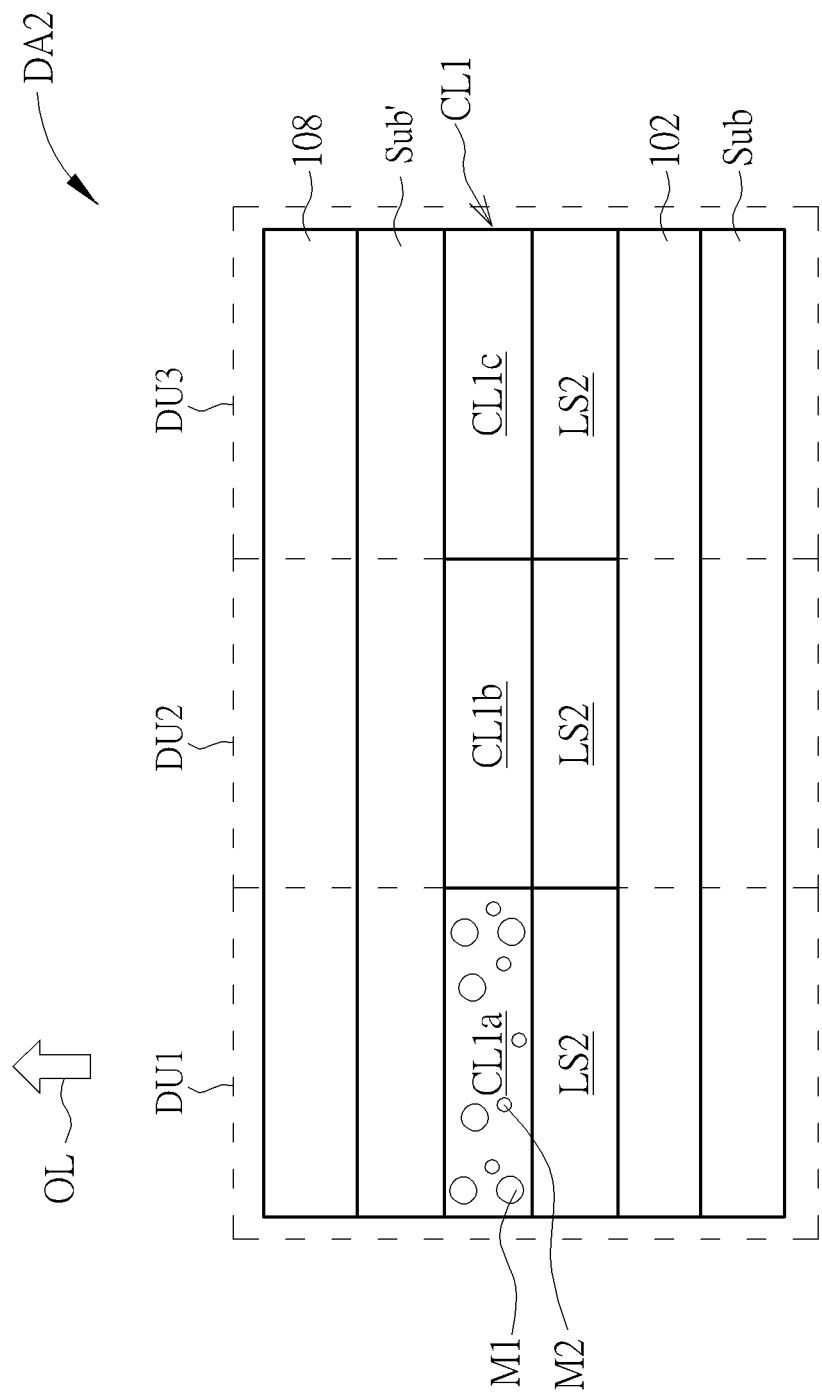
FIG. 9 is a schematic cross-section view of a display device according to a second embodiment of the present disclosure.

Refer to FIG. 8, which is a schematic diagram illustrating an arrangement of the display units in accordance with a variant embodiment of the first embodiment of the present disclosure. As shown in FIG. 8, the arrangement of the display units DU1', the display units DU2' and the display units DU3' of this variant embodiment is different from that of the first embodiment. In this embodiment, two display units DU2' correspond to one display unit DU1' and one display unit DU3' and are disposed between the corresponding display unit DU1' and the corresponding display unit DU3'. Also, a size of each display unit DU2' may be smaller than a size of each display unit DU1' and a size of each display unit DU3'. In this variant embodiment, one of the display units DU2' representing a green sub-pixel and the corresponding display unit DU1' representing a red sub-pixel may form a pixel PX', and the other one of the display units DU2' representing a green sub-pixel and the corresponding display unit DU3' representing a blue sub-pixel may form another pixel PX'. In another embodiment, the display units DU1' representing the red sub-pixel may be exchanged with the display units DU2' representing the green sub-pixel, which means one of the display units DU1' and the corresponding display unit DU2' may form a pixel PX', and the other one of the display units DU1' and the corresponding display unit DU3' may form another pixel PX'. In other embodiment, the display unit DU2' represents a blue sub-pixel, the display units DU1' represents a red sub-pixel, and the display unit DU3' represents a green sub-pixel. In other embodiment, the display unit DU2' represents a blue sub-pixel, the display units DU1' represents a green sub-pixel, and the display unit DU3' represents a red sub-pixel. Refer to FIG. 9, which is a schematic cross-section view of a display device according to a second embodiment of the present disclosure. For clearly showing the display device DA2 of this embodiment, FIG. 9 ignores the capping layer, the barrier layer and the detailed structure of the light sources, but the present disclosure is not limited thereto. As shown in FIG. 9, compared to the display device DA1 of the first embodiment, the light sources LS2 provided by this embodiment may generate lights with substantially same spectrum or substantially same color, and do not include the color adjusting materials. Each display unit DU1, DU2, DU3 may include a part of the light converting layer CL1. In this embodiment, the light converting layer CL1 may include a plurality of first converting units CL1$a$, a plurality of second converting units CL1$b$, and a plurality of third converting units CL1$c$, and each of the first converting units CL1$a$, the second converting units CL1$b$ and the third converting units CL corresponds to one of the display units DU1, the display units DU2 and the display units DU3 respectively. In other words, each display unit DU1 may include a first converting unit CL1$a$, each display unit DU2 may include a second converting unit CL1$b$, and each display unit DU3 may include a third converting unit CL1$c$. Each first converting unit CL1$a$, each second converting unit CL1$b$ and each third converting unit CL may be configured to generate lights with different spectrums or different colors. For this reason, a material of each first converting unit CL1$a$, a material of each second converting unit CL1$b$ and a material of each third converting unit CL1$c$ may be different. Furthermore, wavelengths of the lights generated by the light sources LS2 is smaller than wavelengths of the lights generated by the first converting units CL1$a$, wavelengths of the lights generated by the second converting units CL1$b$ and wavelengths of the lights generated by the third converting units CL1$c$. Accordingly, each first converting unit CL1$a$ can convert the light generated by the corresponding light source LS2 into red light and can represent a red sub-pixel; each second converting unit CL1$b$ can convert the light generated by the corresponding light source LS2 into green light and can represent a green sub-pixel; and each third converting unit CL1$c$ can convert the light generated by the corresponding light source LS2 into blue light and can represent a blue sub-pixel. For example, the light sources LS2 may generate white light or blue light, but not limited thereto. In addition, the first converting unit CL1$a$ may include the first color adjusting material M1 for making the output spectrum of the output light OL have the third intensity integral in the second wavelength range R2, and the second color adjusting material M2 for making the first intensity integral I1 be greater than the second intensity integral I2. The first color adjusting material M1 and the second color adjusting material M2 can be the same as the first embodiment, and will not be redundantly detailed. In this embodiment, the light converting layer CL1 may be a single layer structure, and the first color adjusting material M1 and the second color adjusting material M2 may be disposed in the single layer structure, but not limited herein. In a variant embodiment, the light converting layer CL1 may be a multilayer structure, and the first color adjusting material M1 and the second color adjusting material M2 may be disposed in same one layer or different layers of the multilayer structure. In another variant embodiment, when the lights generated by the light sources LS2 can be used as the light displayed by the display units DU3, the third converting unit CL1$c$ may not include the light converting material, which means the third converting unit CL1$c$ may be formed of a transparent material. Moreover, the display device DA2 of this embodiment may further include another substrate Sub' disposed between the light converting layer CL1 and the optical film 108, but the present disclosure is not limited thereto. Each display unit DU1, each display unit DU2 and each display unit DU3 may include a part of the substrate Sub' respectively.

Figure 10:
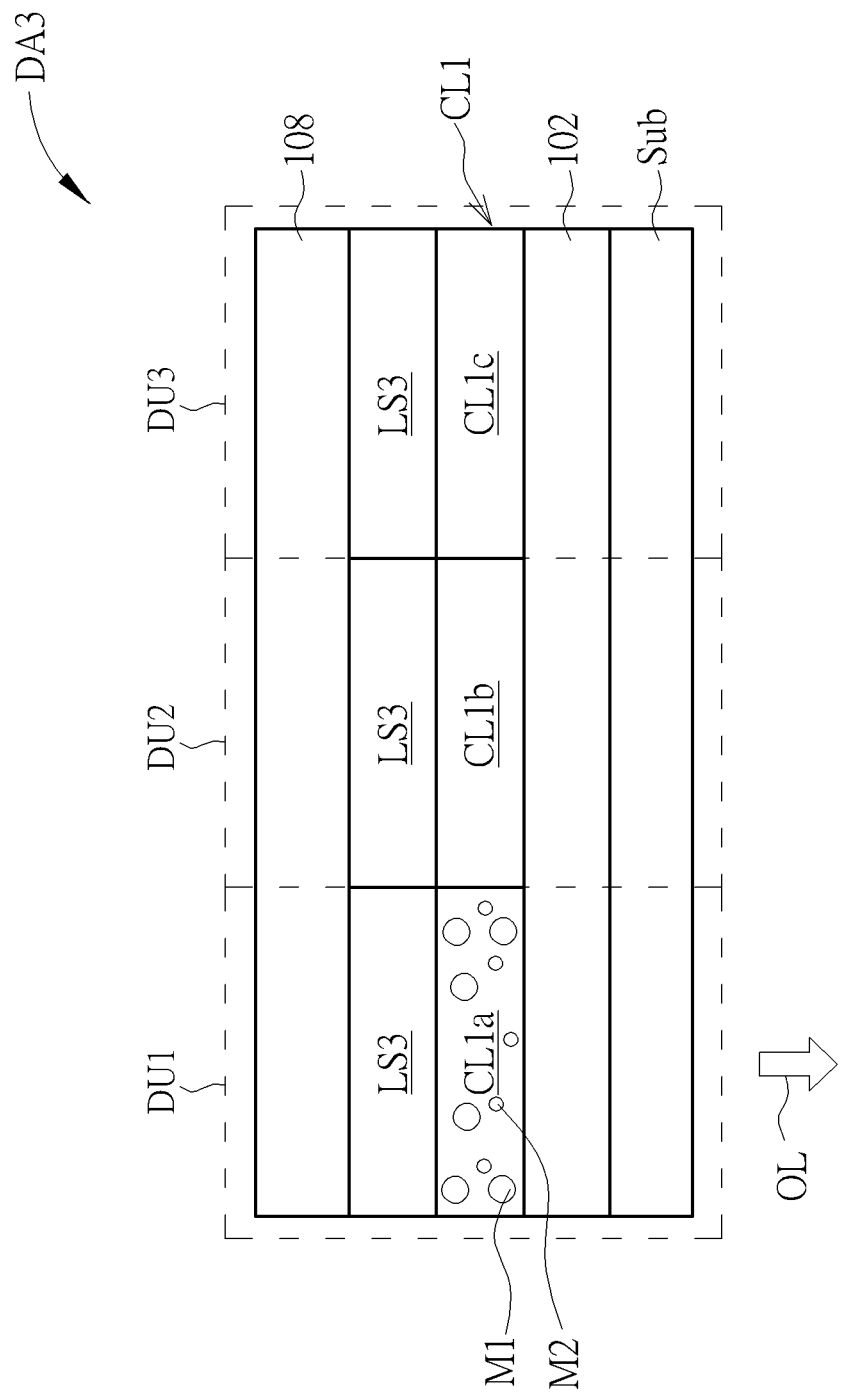
FIG. 10 is a schematic cross-section view of a display device according to a third embodiment of the present disclosure.

Refer to FIG. 10, which is a schematic cross-section view of a display device according to a third embodiment of the present disclosure. For clearly showing the display device DA3 of this embodiment, FIG. 10 ignores the capping layer, the barrier layer and the detailed structure of the light sources, but the present disclosure is not limited thereto. As shown in FIG. 10, compared to the display device DA2 of the second embodiment, the light sources LS3 of this embodiment are disposed between the optical film 108 and the light converting layer CL1, so that the output light OL emitted by the display device DA3 emits out from a bottom surface of the substrate Sub. In order to effectively emit the output light OL from the bottom surface of the substrate Sub, a reflective layer may be selectively disposed between the optical film 108 and the light sources LS3. Also, the display device DA3 of this embodiment may not include the substrate Sub'.

Figure 11:
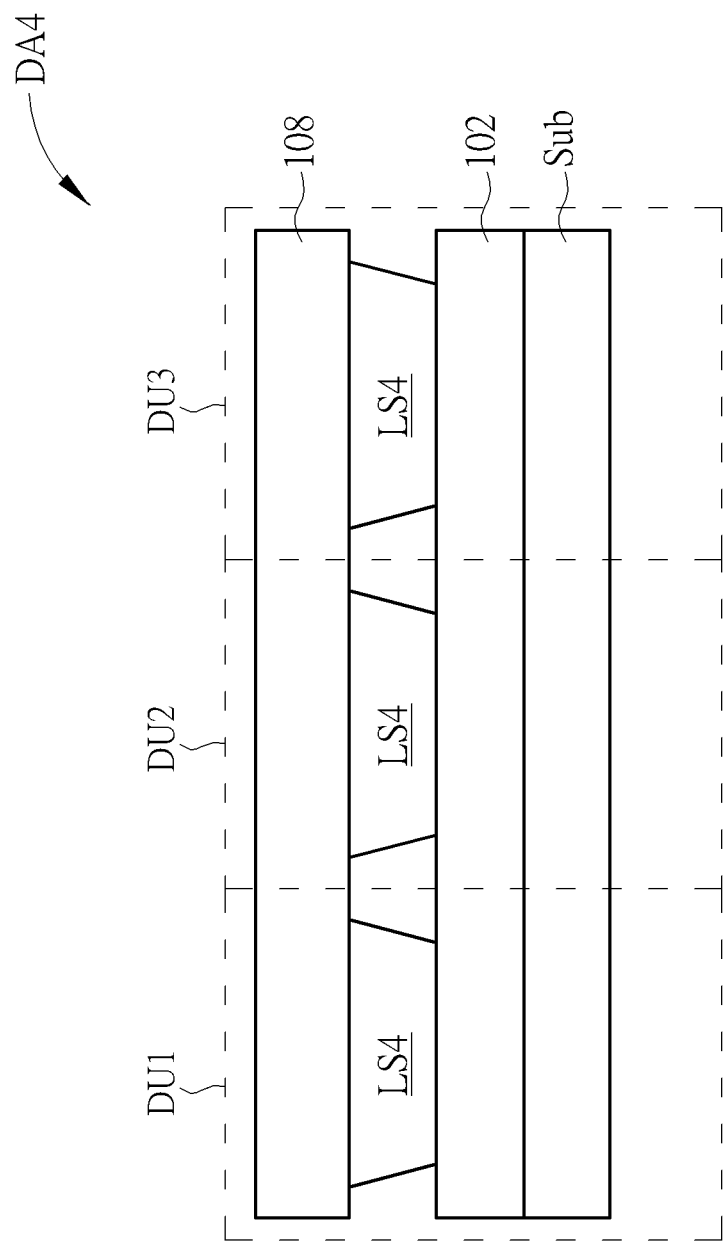
FIG. 11 is a schematic cross-section view of a display device according to a fourth embodiment of the present disclosure.

Refer to FIG. 11, which is a schematic cross-section view of a display device according to a fourth embodiment of the present disclosure. As shown in FIG. 11, compared to the display device DA1 of the first embodiment, each light source LS4 of the display device DA4 provided by this embodiment may include at least one inorganic light-emitting diode (LED), and the LED of each display unit DU1, the LED of each display unit DU2 and the LED of each display unit DU3 may emit lights with different colors or different spectrums. Each LED is a chip with inorganic light emitting material for emitting light. Chip size of a normal LED is in a range from 300 μm to 2 mm. Chip size of a mini-LED is in a range from 100 μm to 300 μm. Chip size of a micro-LED is in a range from 1 μm to 100 μm. In this embodiment, the light source LS4 of each display unit DU1 may include the first color adjusting material and the second color adjusting material similar to the first embodiment. For example, the first color adjusting material and the second color adjusting material may be disposed in the encapsulation layer covering the corresponding LED.

Figure 12:
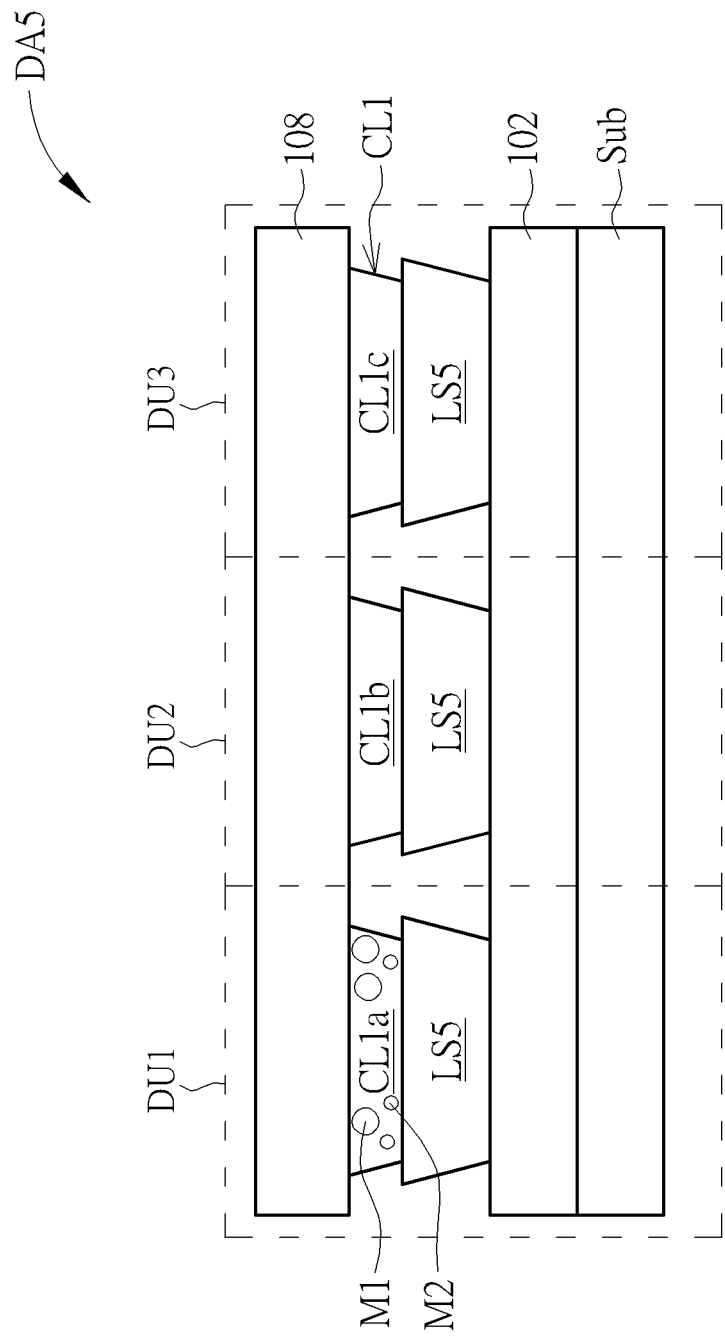
FIG. 12 is a schematic cross-section view of a display device according to a fifth embodiment of the present disclosure.

Refer to FIG. 12, which is a schematic cross-section view of a display device according to a fifth embodiment of the present disclosure. As shown in FIG. 12, compared to the display device DA4 of the fourth embodiment, each light source LS5 of the display device DA5 provided by this embodiment may generate lights with substantially same spectrum or substantially same color. For example, the LEDs of the light sources LS5 of the display units DU1, DU2, DU3 may be the same. The display device DA2 of this embodiment may further include the light converting layer CL1 disposed between the light sources LS5 and the optical film 108 and used for convert or adjust the color of the lights generated by the light sources LS5. Each display unit DU1, DU2, DU3 may include a part of the light converting layer CL1. The light converting layer CL1 of this embodiment is the same as the light converting layer of the second embodiment, and will not be redundantly detailed.

Figure 13:
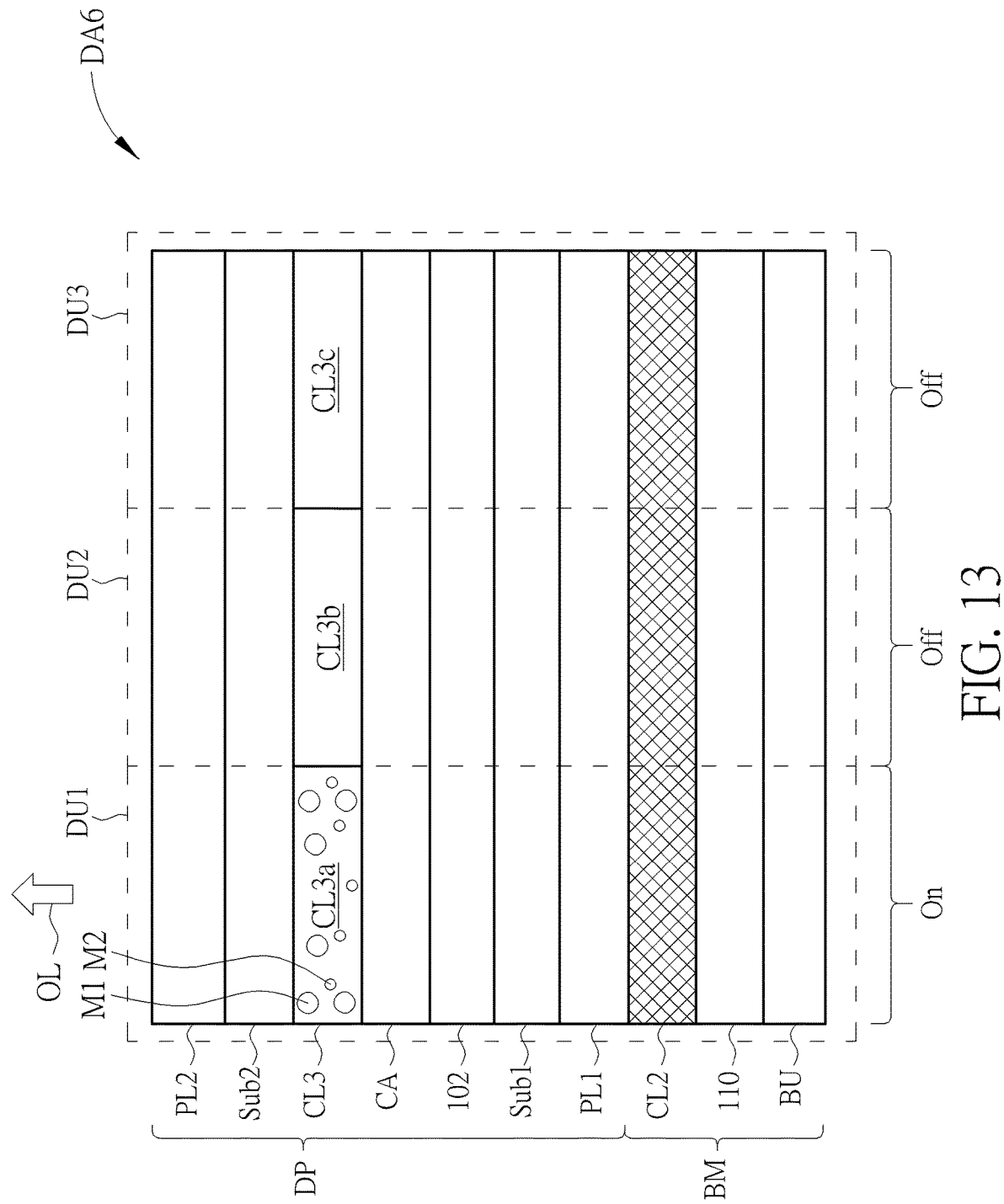
FIG. 13 is a schematic cross-section view of a display device according to a sixth embodiment of the present disclosure.

Refer to FIG. 13, which is a schematic cross-section view of a display device according to a sixth embodiment of the present disclosure. As shown in FIG. 13, compared to the display device DA1 of the first embodiment, the display device DA6 of this embodiment is a non-self-luminous display device. In this embodiment, the display device DA6 is for example a liquid crystal display device, but not limited to. The display device DA6 may substantially include a display panel DP and a backlight module BM. The backlight module BM is disposed on a back surface of the display panel DP, and the backlight module BM at least includes a backlight unit BU for providing backlight to the display panel DP, so that the backlight can become image after penetrating through the display panel DP. In this embodiment, the backlight module BM may further include a light converting layer CL2 disposed between the backlight unit BU and the display panel DP and used for converting or adjusting the spectrum of the color of the backlight generated by the backlight unit BU. The light converting layer CL2 may include a quantum dot material, a color filter material, a phosphor material or a pigment material. For example, when the backlight unit BU generates blue light, the light converting layer CL2 can include the quantum dot material for absorbing the blue light generated by the backlight unit BU and generating yellow light, so that the yellow light can be mixed with the blue light into white light as the backlight, but not limited thereto. In a variant embodiment, the backlight unit BU also can produce white light. Also, the backlight module BM may optionally further include an optical film 110 disposed between the backlight unit BU and the light converting layer CL2.

The display panel DP includes a first substrate Sub1, a second substrate Sub2 and a light modulating layer CA. The first substrate Sub1 and the second substrate Sub2 are disposed opposite to each other, and the light modulating layer CA is disposed between the first substrate Sub1 and the second substrate Sub2. The first substrate Sub1 and the second substrate Sub2 may be a hard substrate or a flexible substrate respectively. The light modulating layer CA may be used for adjusting a gray level (or an intensity) of the light from the backlight module BM. Since the display device DA6 of this embodiment is the liquid crystal display device, the light modulating layer CA can include a liquid crystal layer including a plurality of liquid crystal molecules, but not limited thereto. The display panel DP of this embodiment may further include a first polarizer PL1 and a second polarizer PL2. The first substrate Sub1 and the second substrate Sub2 are disposed between the first polarizer PL1 and the second polarizer PL2, so that the light modulating layer CA can be cooperated with the polarization direction of the first polarizer PL1 and the polarization direction of the second polarizer PL2 to achieve the control of the gray level of the light. In this embodiment, the first substrate Sub1 and the first polarizer PL1 are disposed between the backlight module BM and the light modulating layer CA, but not limited thereto.

Additionally, the display panel DP may further include a circuit layer 102 and another light converting layer CL3. The circuit layer 102 is used for controlling the light modulating layer CA and further adjusting the gray level of the light. In this embodiment, the circuit layer 102 may be disposed between the first substrate Sub1 and the light modulating layer CA, but not limited thereto. In a variant embodiment, the circuit layer 102 may be disposed between the second substrate Sub2 and the light modulating layer CA.

The light modulating layer CL3 of this embodiment is disposed between the light modulating layer CA and the second substrate Sub2 and used for converting or adjusting the spectrum or the color of the light generated by the backlight module BM, but the position of the light converting layer CL3 is not limited thereto. In another variant embodiment, the light converting layer CL3 may be disposed between the light modulating layer CA and the first substrate Sub1. The light converting layer CL3 of this embodiment may include a quantum dot material, a color filter material, a phosphor material or a pigment material. It should be noted that since both the light converting layer CL2 and the light converting layer CL3 have ability to adjust the color of the backlight, the first color adjusting material M1 for making the output spectrum of the output light have the third intensity integral in the second wavelength range and the second color adjusting material M2 for making the first intensity integral be greater than the second intensity integral can be included in one of a part of the light converting layer CL2 in the display unit DU1 and a part of the light converting layer CL3 in the display unit DU1, or any one of the first color adjusting material M1 and the second color adjusting material M2 can be included in any one of the part of the light converting layer CL2 and the part of the light converting layer CL3 in the display unit DU1. The first color adjusting material M1 and the second color adjusting material M2 of this embodiment is the same as the first embodiment, and will not be redundantly detailed. The light converting layer CL3 may for example further include a plurality of first converting units CL3a, a plurality of second converting units CL3b and a plurality of third converting units CL3c. Each first converting unit CL3a corresponds to each display unit DU1 respectively, each second converting unit CL3b corresponds to each display unit DU2 respectively, and each third converting unit CL3c corresponds to each display unit DU3. Each first converting unit CL3a, each second converting unit CL3b and each third converting unit CL3c may be used for generating lights with different spectrums or different colors, and the material of each first converting unit CL3a, the material of each second converting unit CL3b and the material of each third converting unit CL3c may be different. Also, when each first converting unit CL3a includes the first color adjusting material M1 and the second color adjusting material M2, the light converting layer CL2 may cover the whole backlight unit BU, but not limited thereto. In a variant embodiment, the light converting layer CL2 may further include a plurality of first converting units, a plurality of second converting units and a plurality of third converting units. In another variant embodiment, when the backlight unit BU generates white light, the light from each first converting unit, the light from each second converting unit and the light from each third converting unit of the first the light converting layer CL2 may be mixed into white light as the backlight, and each first converting unit, each second converting unit and each third converting unit may not correspond to each first display unit, each second display unit and each third display unit one by one.

In this embodiment, each display unit DU1, DU2, DU3 may include a part of the backlight module BM and a part of the display panel DP respectively. For example, each display unit DU1, DU2, DU3 may include a part of backlight unit BU, a part of the optical film 110, a part of the light converting layer CL2, a part of the first polarizer PL1, a part of the first substrate Sub1, a part of the circuit layer 102, a part of the light modulating layer CA, a part of the light converting layer CL3, a part of the second substrate Sub2, and a part of the second polarizer PL2 respectively, and the output light OL can be regarded as the final visual light of each display unit DU1 to the observer, but the layers included in each display unit of the present disclosure is not limited herein.

Figure 14:
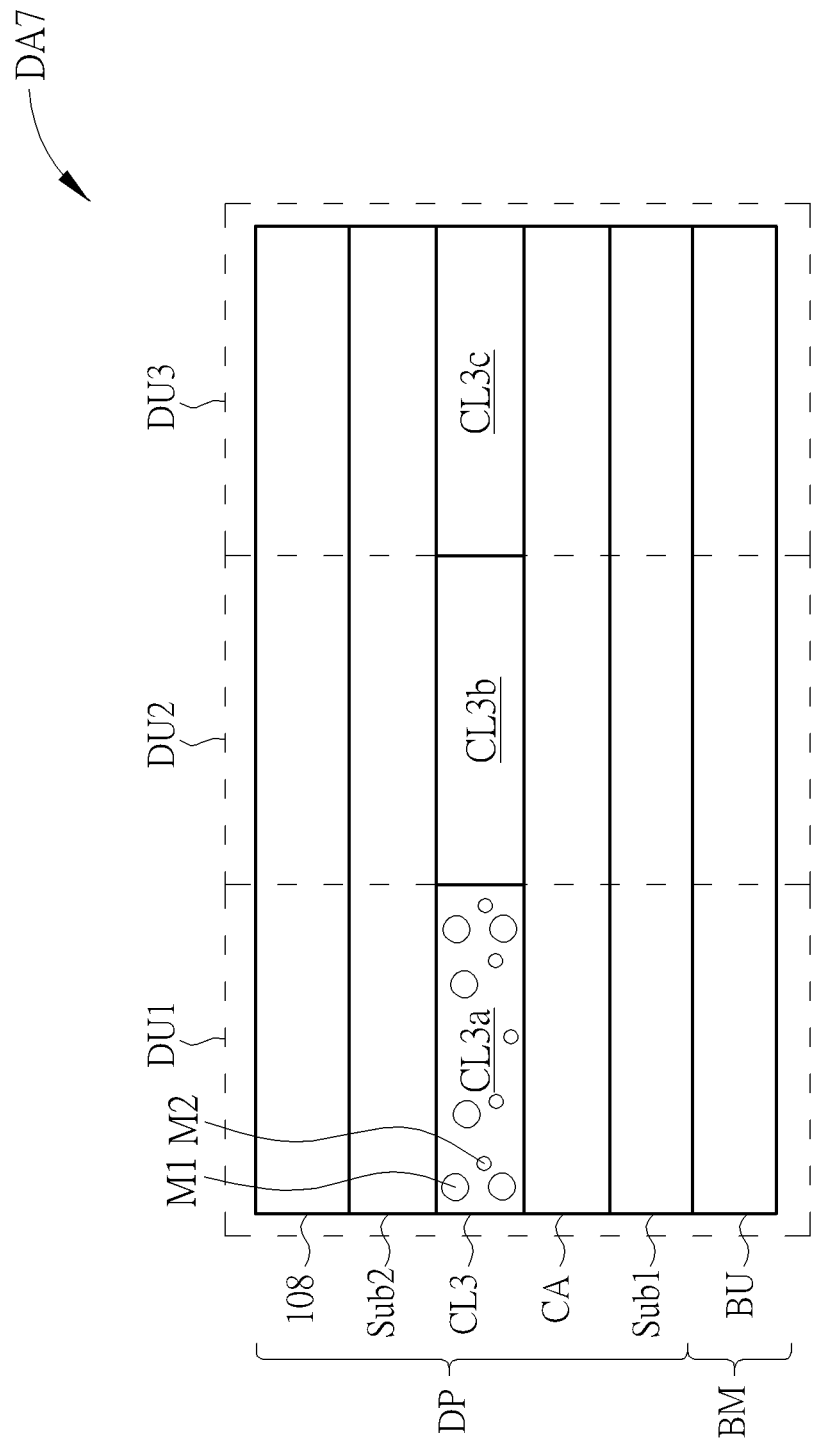
FIG. 14 is a schematic cross-section view of a display device according to a seventh embodiment of the present disclosure.

Refer to FIG. 14, which is a schematic cross-section view of a display device according to a seventh embodiment of the present disclosure. For clearly showing the display device DA7 of this embodiment, FIG. 14 ignores the first polarizer, the second polarizer and the circuit layer, but the present disclosure is not limited thereto. As shown in FIG. 14, compared to the display device DA6 of the sixth embodiment, the display device DA7 of this embodiment may not include the light converting layer CL2 and the optical film 110, and the backlight module BM may be formed of the backlight unit BU. The light converting layer CL3 may include the first color adjusting material M1 and the second color adjusting material M2 that are the same as the sixth embodiment and will not be redundantly described. Based on the material of the third converting unit CL3c, the backlight generated by the backlight unit BU may be white or blue, but not limited thereto. In this embodiment, the display device DP may further include the optical film 108 disposed on the second substrate Sub2.

Figure 15:
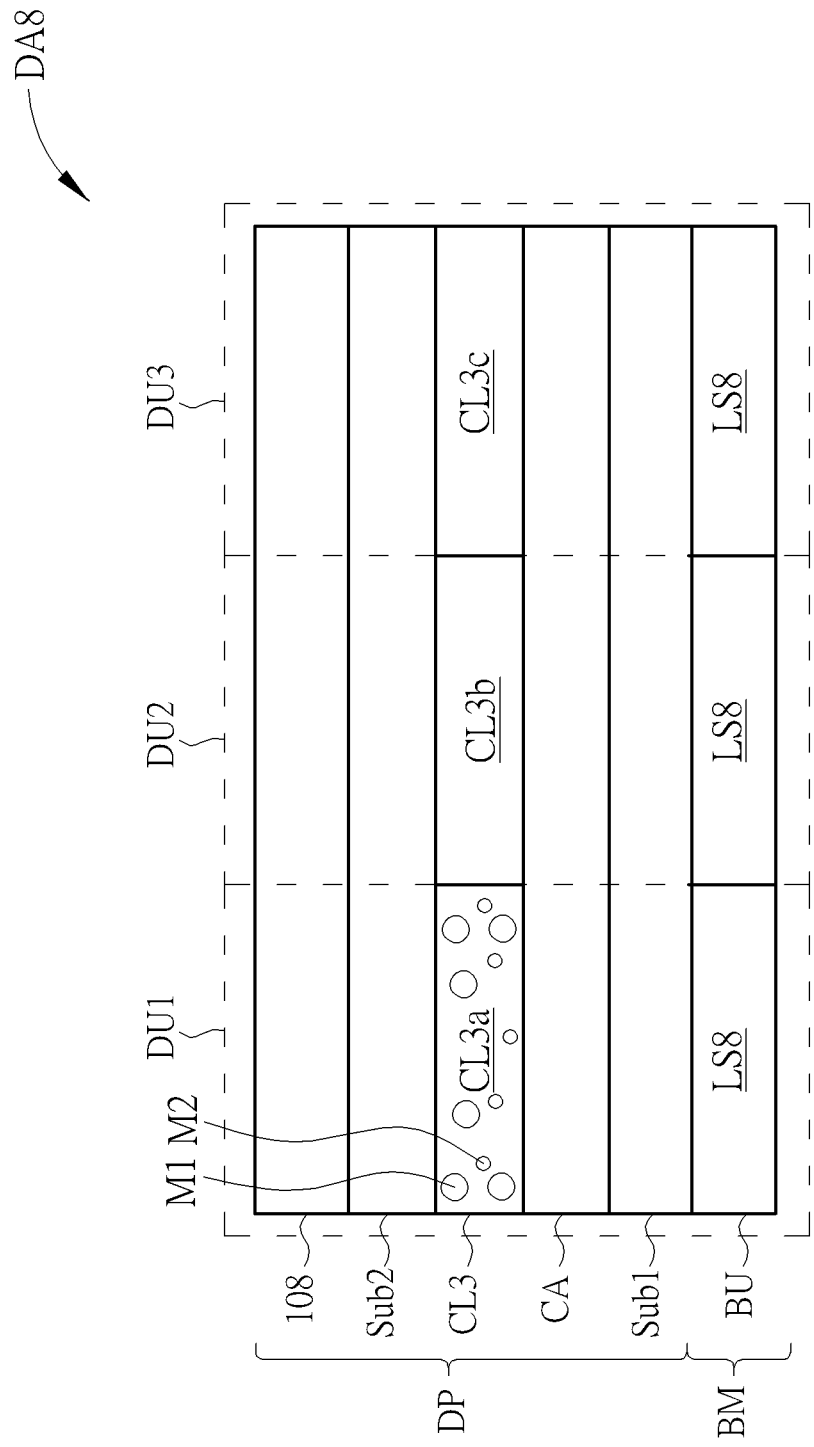
FIG. 15 is a schematic cross-section view of a display device according to an eighth embodiment of the present disclosure.

Refer to FIG. 15, which is a schematic cross-section view of a display device according to an eighth embodiment of the present disclosure. As shown in FIG. 15, compared to the display device DA7 of the seventh embodiment, the backlight unit BU of the display device DA8 provided in this embodiment may include a plurality of light sources LS8, and each display unit DU1, DU2, DU3 include corresponding one of the light sources LS8 respectively. In other words, the backlights of the display units DU1, the display units DU2, the display units DU3 are not the same one and are generated by corresponding light source LS8 respectively. In this embodiment, both the first color adjusting material M1 and the second color adjusting material M2 can be included in one of the light source LS8 and the first converting unit CL3a in each display unit DU1, or any one of the first color adjusting material M1 and the second color adjusting material M2 can be included in any one of the light source LS8 and the first converting unit CL3a in each display unit DU1.

Figure 16:
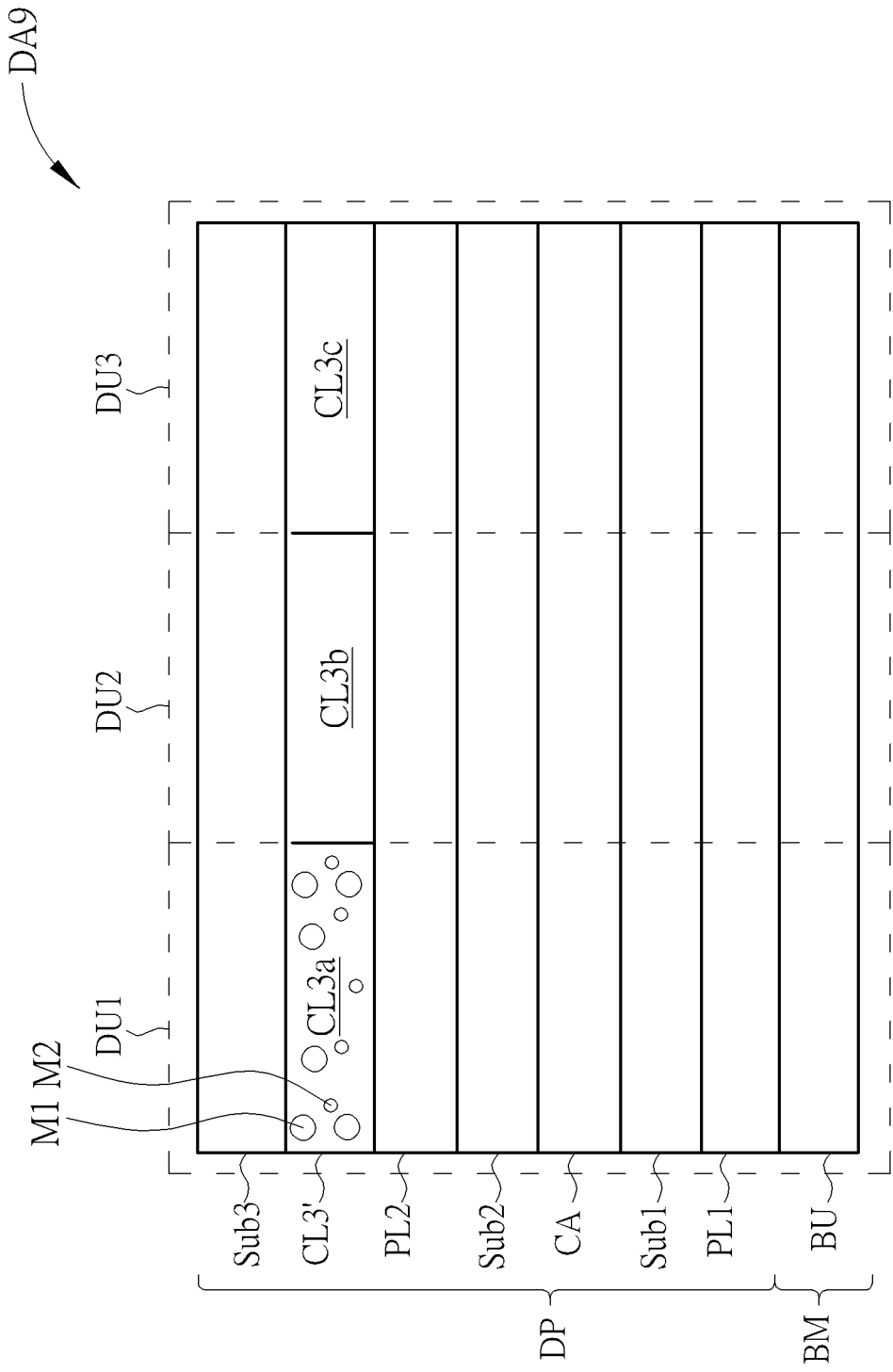
FIG. 16 is a schematic cross-section view of a display device according to a ninth embodiment of the present disclosure.

Refer to FIG. 16, which is a schematic cross-section view of a display device according to a ninth embodiment of the present disclosure. As shown in FIG. 16, compared to the display device DA6 of the seventh embodiment, the light converting layer CL3' of the display panel DP provided in this embodiment is disposed on the second substrate Sub2, which means the second substrate Sub2 is disposed between the light converting layer CL3' and the light modulating layer CA. The display device DA9 of this embodiment may further include a third substrate Sub3 covering the light converting layer CL3'. For example, the light converting layer CL3' is disposed between the second polarizer PL2 and the third substrate Sub3.

To summarize, for the display unit that produces red output light, a specific spectrum profile of the red output light corresponding to a highest gray level is provided according to the display device of the present disclosure. A ratio of an intensity integral of the output spectrum from 380 nm to 543 nm to a difference between an intensity integral of the output spectrum from the first wavelength to 780 nm and an intensity integral of the output spectrum from 543 nm to the first wavelength is greater than or equal to 0.5% and less than or equal to 38.0%, or a ratio of a maximum peak of the output spectrum between 380 nm to 543 nm to a maximum peak of the output spectrum between 543 nm to 780 nm is greater than or equal to 0.1% and less than or equal to 1.5%. Therefore, the red output light of the display unit in the display device of the present disclosure corresponding to a highest gray level can meet the Rec. 2020 color gamut and provide high perception to the L size cone cells of human eyes. Accordingly, the perception experience of the uses is improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
  a display unit emitting an output light having an output spectrum corresponding to a highest gray level of the display device,
  wherein a maximum peak of the output spectrum from 543 nm to 780 nm is defined as a first intensity peak corresponding to a first wavelength, an intensity integral of the output spectrum from the first wavelength to 780 nm is defined as a first intensity integral, an intensity integral of the output spectrum from 543 nm to the first wavelength is defined as a second intensity integral, and the first intensity integral is greater than the second intensity integral.

2. The display device according to claim 1, wherein a fourth wavelength and a fifth wavelength respectively correspond to an intensity of a quarter of the first intensity peak, the fourth wavelength is less than the fifth wavelength, a ratio of an intensity integral of the output spectrum from 543 nm to the fourth wavelength to an intensity integral of the output spectrum from the fifth wavelength to 780 nm is greater than or equal to 37.0% and less than or equal to 82.0%.

3. The display device according to claim 1, wherein the first wavelength is greater than or equal to 604 nm and less than or equal to 644 nm.

4. The display device according to claim 1, wherein a sum of the first intensity integral and the second intensity integral is defined as a first sum, an intensity integral of the output spectrum from 380 nm to 543 nm is defined as a third intensity integral, and the first sum is greater than the third intensity integral.

5. The display device according to claim 1, wherein a maximum peak of the output spectrum from 380 nm to 496 nm is defined as a second intensity peak, a maximum peak of the output spectrum from 496 nm to 543 nm is defined as a third intensity peak, and the second intensity peak is greater than the third intensity peak.

6. The display device according to claim 1, wherein a maximum peak of the output spectrum from 380 nm to 496 nm is defined as a second intensity peak, and the second intensity peak is less than a half of the first intensity peak.

7. The display device according to claim 1, wherein the output spectrum from 380 nm to 543 nm includes at least two intensity peaks.

8. The display device according to claim 1, wherein a second wavelength and a third wavelength respectively corresponds to an intensity of a half of the first intensity peak, the second wavelength is less than the third wavelength, an intensity integral of the output spectrum from 543 nm to the second wavelength is defined as a sixth intensity integral, an intensity integral of the output spectrum from the third wavelength to 780 nm is defined as a seventh intensity integral, and the sixth intensity integral is less than the seventh intensity integral.

9. The display device according to claim 1, wherein a sixth wavelength and a seventh wavelength respectively corresponds to an intensity of an eighth of the first intensity peak, the sixth wavelength is less than the seventh wavelength, a ratio of an intensity integral of the output spectrum from 543 nm to the sixth wavelength to an intensity integral of the output spectrum from the seventh wavelength to 780 nm is greater than or equal to 26.0% and less than or equal to 90.0%.

10. The display device according to claim 1, wherein an intensity integral of the output spectrum from 380 nm to 496 nm is defined as a fourth intensity integral, an intensity integral of the output spectrum from 496 nm to 543 nm is defined as a fifth intensity integral, a ratio of the fifth intensity integral to the fourth intensity integral is greater than or equal to 1.0% and less than or equal to 77.0%.

11. The display device according to claim 1, wherein a second wavelength and a third wavelength respectively corresponds to an intensity of a half of the first intensity peak, the second wavelength is less than the third wavelength, an intensity integral of the output spectrum from 543 nm to the second wavelength is defined as a sixth intensity integral, an intensity integral of the output spectrum from the third wavelength to 780 nm is defined as a seventh intensity integral, a ratio of the sixth intensity integral to the seventh intensity integral is greater than or equal to 37.0% and less than or equal to 99.0%.

12. The display device according to claim 1, further comprising:
a first substrate and a second substrate disposed opposite to each other;
a light modulating layer disposed between the first substrate and the second substrate;
a backlight unit, wherein the first substrate is disposed between the light modulating layer and the backlight unit; and
a light converting layer, wherein the light converting layer is disposed between the backlight unit and the first substrate, the light converting layer is disposed between the light modulating layer and the second substrate, or the first substrate is disposed between the light modulating layer and the light converting layer.

13. The display device according to claim 12, wherein the light converting layer comprises a first color adjusting material and a second color adjusting material, an intensity integral of the output spectrum from 380 nm to 543 nm is defined as a third intensity integral, the third intensity integral of the output spectrum of the output light is corresponding to the first color adjusting material, and the first intensity integral being greater than the second intensity integral is corresponding to the second color adjusting material.

14. The display device according to claim 12, further comprising a display panel and another light converting layer, wherein the display panel comprises the light converting layer, and the another light converting layer is disposed between the backlight unit and the display panel.

15. The display device according to claim 1, further comprising:
a substrate; and
a plurality of light sources disposed on the substrate.

16. The display device according to claim 15, wherein one of the plurality of light sources in the display unit comprises a first color adjusting material and a second color adjusting material, an intensity integral of the output spectrum from 380 nm to 543 nm is defined as a third intensity integral, the third intensity integral of the output spectrum of the output light is corresponding to the first color adjusting material, and a difference between the first intensity integral and the second intensity integral of the output spectrum of the output light is corresponding to the second color adjusting material.

17. The display device according to claim 15, further comprising a light converting layer, wherein the light converting layer is disposed on the plurality of light sources, an intensity integral of the output spectrum from 380 nm to 543 nm is defined as a third intensity integral, the third intensity integral of the output spectrum of the output light is corresponding to the light converting layer, and a difference between the first intensity integral and the second intensity integral of the output spectrum of the output light is corresponding to the light converting layer.

18. The display device according to claim 17, wherein the plurality of light sources generate light with same color.

19. The display device according to claim 15, further comprising a circuit layer disposed between the plurality of light sources and the substrate.

20. The display device according to claim 1, wherein the display unit is a red sub-pixel.

* * * * *